United States Patent
Kawaguchi

(10) Patent No.: US 11,424,917 B2
(45) Date of Patent: Aug. 23, 2022

(54) DEVICE FOR SECRET SHARING-BASED MULTI-PARTY COMPUTATION

(71) Applicant: NOMURA RESEARCH INSTITUTE, LTD., Tokyo (JP)

(72) Inventor: Masashi Kawaguchi, Tokyo (JP)

(73) Assignee: NOMURA RESEARCH INSTITUTE, LTD., Tokyo (JP)

(*) Notice: Subject to any disclaimer, the term of this patent is extended or adjusted under 35 U.S.C. 154(b) by 112 days.

(21) Appl. No.: 16/829,594

(22) Filed: Mar. 25, 2020

(65) Prior Publication Data

US 2021/0258149 A1  Aug. 19, 2021

(30) Foreign Application Priority Data

Feb. 14, 2020 (JP) ............... JP2020-022997

(51) Int. Cl.
*G06F 21/00* (2013.01)
*H04L 29/06* (2006.01)
*H04L 9/08* (2006.01)

(52) U.S. Cl.
CPC ............ *H04L 9/085* (2013.01); *H04L 9/0819* (2013.01); *H04L 9/0869* (2013.01); *H04L 9/0891* (2013.01)

(58) Field of Classification Search
CPC ..... H04L 9/085; H04L 9/0819; H04L 9/0891; H04L 9/0869
See application file for complete search history.

(56) References Cited

U.S. PATENT DOCUMENTS

| | | | | |
|---|---|---|---|---|
| 5,949,975 A * | 9/1999 | Batty | ............... | G06F 9/5066 709/213 |
| 8,280,048 B2 * | 10/2012 | Lambert | ............... | H04L 9/0891 380/46 |
| 9,230,075 B1 * | 1/2016 | Robinson | ............... | G06F 21/31 |
| 9,292,671 B1 * | 3/2016 | Robinson | ............... | H04L 63/083 |
| 9,426,185 B1 * | 8/2016 | Vora | ............... | H04L 65/1069 |
| 10,516,527 B1 * | 12/2019 | Machani | ............... | H04L 9/0894 |
| 2009/0287921 A1 * | 11/2009 | Zhu | ............... | H04L 63/0869 713/155 |
| 2014/0237559 A1 * | 8/2014 | Zhang | ............... | H04L 63/062 726/4 |
| 2020/0092722 A1 * | 3/2020 | Hu | ............... | H04L 9/3234 |
| 2020/0228325 A1 * | 7/2020 | Fan | ............... | H04L 63/083 |
| 2020/0250146 A1 * | 8/2020 | Malluhi | ............... | G06F 16/1774 |
| 2020/0389304 A1 * | 12/2020 | Gryb | ............... | H04L 9/085 |

OTHER PUBLICATIONS

Ohara, "Secret computation using secret sharing schemes", The Institute of Systems, Control and Information Engineers, vol. 63, No. 2, pp. 71-76, 2019; Retrievable from the Internet: <https://www.jstage.jst.go.jp/article/sciesci/63/2/63_71/_pdf>; Discussed in Specification.

* cited by examiner

*Primary Examiner* — Lisa C Lewis
(74) *Attorney, Agent, or Firm* — Rankin, Hill & Clark LLP

(57) ABSTRACT

A device participates in secret sharing-based MPC. Original data can be restored by combining a share of the device with a corresponding share of another device. The device includes means for acquiring random number and means for updating a share of the device on the basis of the acquired random number. A method for updating by the updating means is designed to perform update in a manner that a share of the device updated on the basis of the acquired random number is combined with the corresponding share of the other device updated on the basis of the random number to cancel an influence of the random number and restore the original data.

8 Claims, 23 Drawing Sheets

GENERATE SHARES OF EACH BT VALUE IN 8-BIT ENVIRONMENT (MODULUS: 256)

FIG. 9
13
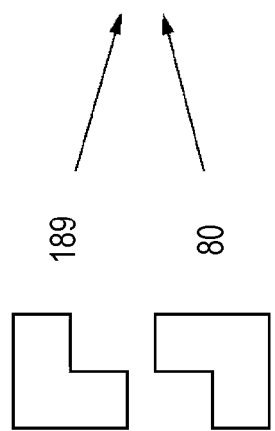
189  80
(189+80)%256 = 13

FIG. 10
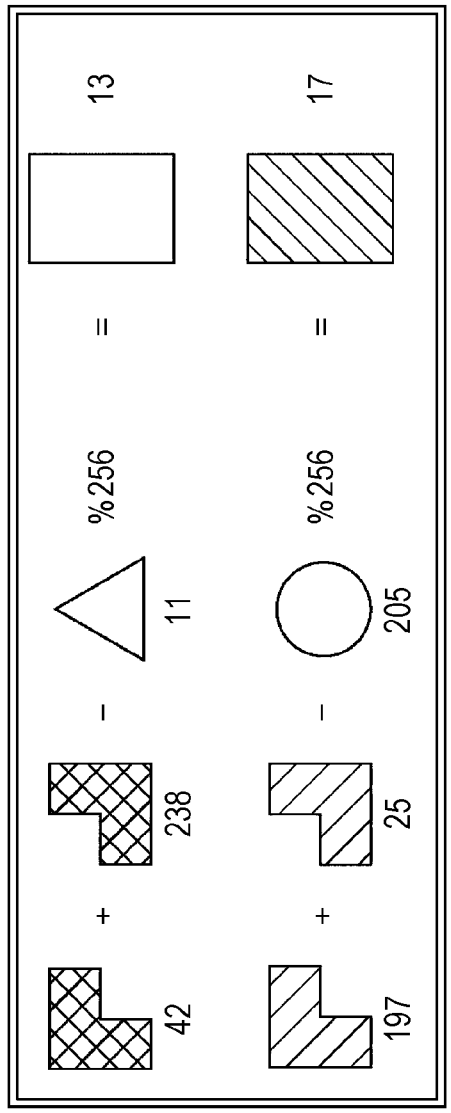
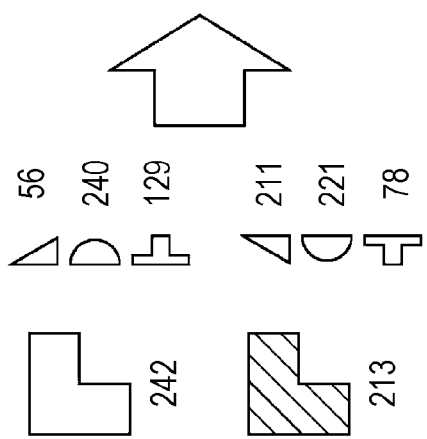

FIG. 17

| SHARE ID | REVISION NUMBER | USER ID |
|---|---|---|
| A012 | Rev1 | (NONE) |
| | Rev2 | (NONE) |
| | Rev3 | (NONE) |
| | Rev4 | U23 |
| | Rev5 | U254, U21 |
| | Rev6 | U89 |
| | Rev7 | (NONE) |
| | Rev8 | U254 |
| | Rev9 | (NONE) |
| | Rev10 | (NONE) |
| B332 | Rev1 | (NONE) |
| | Rev2 | U54 |

112

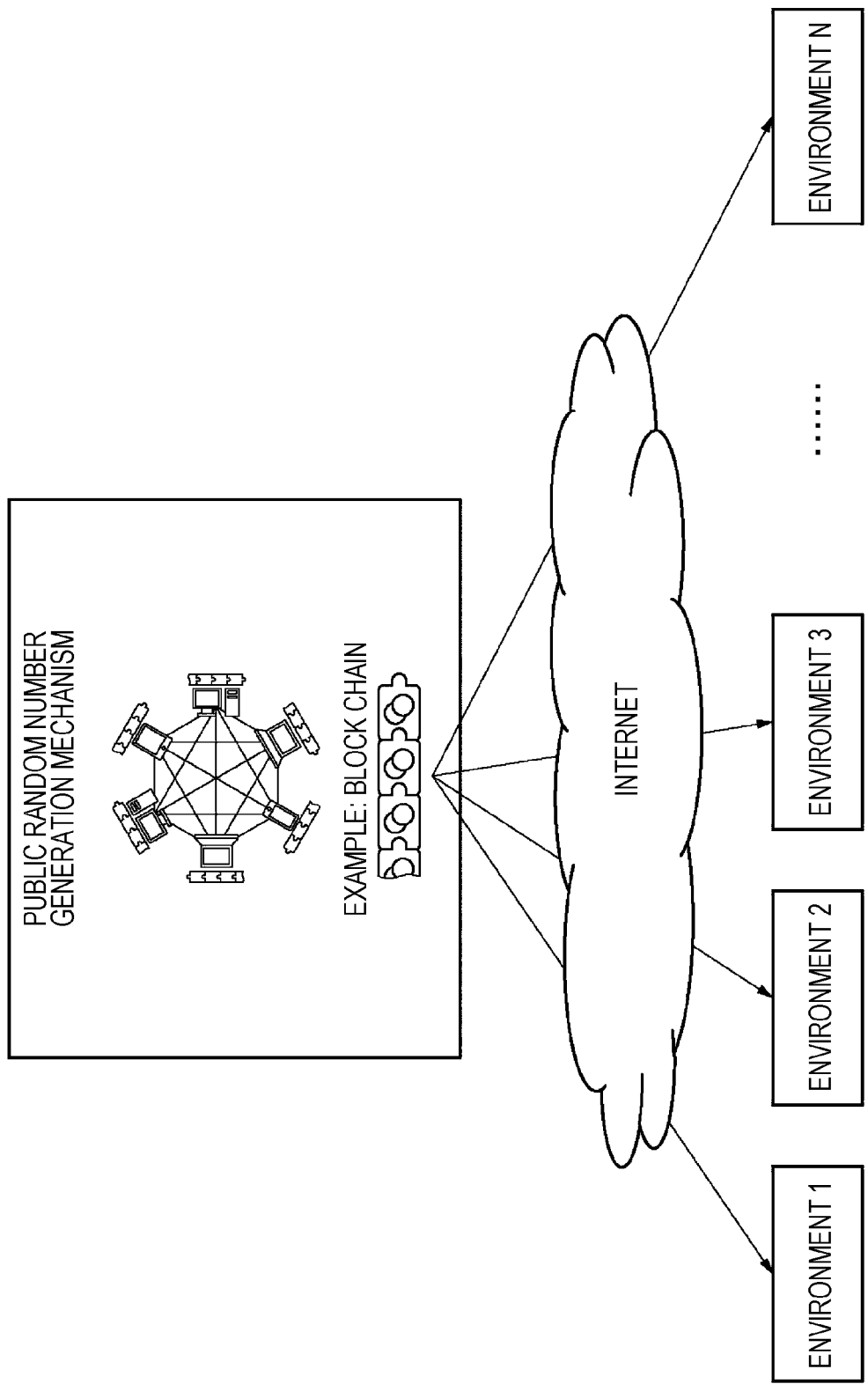

DEVICE FOR SECRET SHARING-BASED MULTI-PARTY COMPUTATION

TECHNICAL FIELD

The present invention relates to a device for holding shares used for secret sharing-based multi-party computation.

BACKGROUND ART

Sustainable development goals (SDGs) are international goals for a better and more sustainable world. The Ministry of Foreign Affairs of Japan is backing the SDGs, stating that the SDGs are the universal issues that not only developing countries but also developed countries themselves should work on.

While it is recognized that the use of so-called big data is a contributing factor in achieving the SDGs, it is also recognized that there are risks of "human rights" and "privacy". If both the use of big data and the protection of privacy can be achieved simultaneously, it is considered possible to create social value as well as economic value.

An example of promoting data utilization is providing data to third parties. It is often the case that data that may identify individuals from the provided data is subject to measures such as pseudonymization/anonymization. However, these techniques necessitate a trade-off between availability and secrecy of data. In other words, it is necessary to determine between giving priority to obtaining a high-accuracy tally result at the expense of the strength of privacy protection or, conversely, giving up the accuracy of the tally result with priority to privacy protection.

"Secret computation" is a technology that solves such a trade-off problem and supports creation of economic value and social value (see Non Patent Literature 1). The secret computation is a technology that enables calculation while hiding input values. This technique makes it possible to change the above-described trade-off situation into a trade-on.

Further, the issue of data management responsibility in organizations has been receiving a great deal of attention in order to realize a data utilization society. For example, the improper handling of data has been thought to be a problem in the past in a number of organizations, and consumers who are data subjects cannot judge by themselves, in many cases, as to whether the organization they are going to provide their own data is a reliable organization. For organizations, leakage of the data accumulated through businesses and services can lead to loss of social credibility in addition to economic loss. Building a sustainable business environment requires not only efforts to increase trust through institutional capacity or governance, but also fundamental innovations to prevent undermining of trust. For this, "secret computation" is one means for contributing.

CITATION LIST

Non Patent Literature

Non Patent Literature 1: URL: https://www.jstage.jst.go.jp/article/isciesci/63/2/63_71/_pdf, search Jan. 29, 2020

SUMMARY OF INVENTION

Technical Problem

As described above, the introduction of the secret computation scheme enables accurate data analysis while reducing the risk of data leakage. However, attacks have become more sophisticated and large-scale, as seen in several big data leaks that have occurred in recent years, and further improvements in security are required.

The present invention has been made in view of such a problem, and it is an object of the present invention to provide a technique capable of further increasing the security against data leakage in secret sharing-based multi-party computation (MPC), which is one of secret computations.

Solution to Problem

One aspect of the present invention relates to a device. The device participates in secret sharing-based multi-party computation. Original data can be restored by combining a share of the device with a corresponding share of another device. The device includes means for acquiring random number and means for updating a share of the device on the basis of the acquired random number. A method for updating by the updating means is designed to perform update in a manner that a share of the device updated on the basis of the acquired random number is combined with the corresponding share of the other device updated on the basis of the random number to cancel an influence of the random number and restore the original data.

Note that any combination of the above-described constituent elements or what is obtained by mutually substituting the constituent elements and representations of the present invention for a device, a method, a system, a recording medium storing the computer program, or the like is also included as an aspect of the present invention.

Advantageous Effects of Invention

According to the present invention, security against data leakage can further be improved in the secret sharing-based multi-party computation which is a kind of secret computation.

BRIEF DESCRIPTION OF DRAWINGS

FIG. 9 is a schematic diagram illustrating a first pattern of occurrence of leakage.

FIG. 10 is a schematic diagram illustrating a second pattern of occurrence of leakage.

FIG. 17 is a data structure diagram illustrating an example of an access history holding unit in FIG. 15.

FIG. 26 illustrates generation of random numbers on the basis of hash values of Ethereum transactions.

DESCRIPTION OF EMBODIMENTS

Hereinafter, the same or equivalent components, members, and processing steps illustrated in individual drawings are denoted by the same reference signs, and the repeated description will be omitted as appropriate. In addition, some members that are not important for the description are omitted in each drawing.

Overview of Secret Sharing Scheme

The secret sharing scheme refers to a technique that enables restoration of original data by dividing the data into two or more pieces and collecting a number of divided data pieces equal to or greater than a threshold (fixed number). The value after the division is called "share" or "tally". The ISO standard for the secret sharing technology is specified in ISO/IEC 19592-2: 2017. The merit of the secret sharing scheme is that each share is stored in a different storage area, so that the original data cannot be restored even if a share less than the threshold is illegally acquired.

In the secret sharing scheme, there is an implementation that can divide data into N data pieces (N is an integer equal to or more than 2) and restore the original data after collecting T data pieces (T is an integer equal to or more than 2 and equals to or less than N). This scheme is called a threshold scheme. The threshold scheme includes, for example, T-out-of-N secret sharing (also referred to as (T, N) secret sharing). T-out-of-N secret sharing is a scheme that can protect confidentiality (=no secret leakage) even when (T−1) data pieces out of N data pieces are stolen, and maintain data integrity (=does not impair restorability) even when up to (N−T) data pieces are broken.

Figure 1:
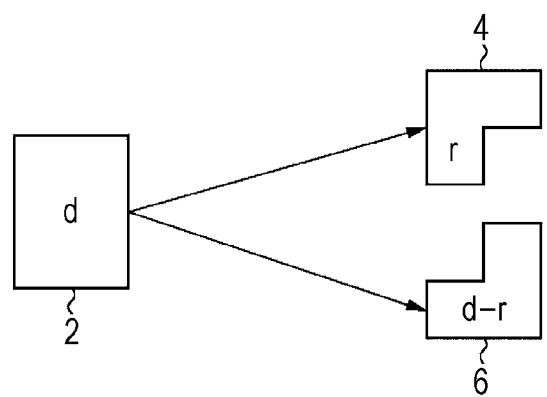
FIG. 1 is a schematic diagram illustrating 2-out-of-2 secret-shared data.

FIG. 1 is a schematic diagram illustrating 2-out-of-2 secret-shared data. In this scheme, data 2 is divided into two shares 4 and 6, and the original data 2 can be restored by collecting these two shares 4 and 6. Generating shares in the case of additive secret sharing scheme is described specifically. Assume that the data 2 to be protected is d. First, a random number denoted by r is generated. Let r be a first share (share 4). Let (d−r) be a second share (share 6). Values of the shares are often represented as discrete data expressed on a finite field. Simply stated, a value of modulus is predetermined before generating shares and the value is divided into a desired number of values using a random number. Each divided value is operated with the value of modulus to give a remainder (modulo operation: % or mod), thus determining the value of the share. In general, the description of the remainder is often omitted, and so does in the present specification except for some part.

Adding two shares results in share 4+share 6=r+(d−r)=d, thus successfully restoring data 2($d$).

Figure 2:
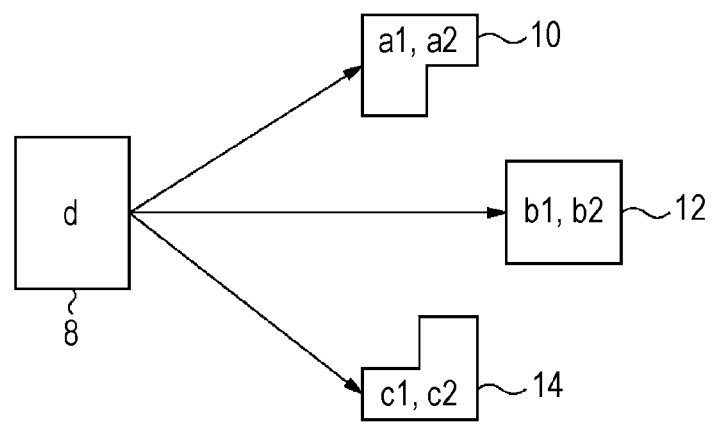
FIG. 2 is a schematic diagram illustrating 2-out-of-3 secret-shared data.

FIG. 2 is a schematic diagram illustrating 2-out-of-3 secret-shared data. In this scheme, data 8 is divided into three share value pairs 10, 12, and 14, and the original data 8 can be restored by collecting two of the three share value pairs 10, 12, and 14. Generating shares in the case of additive secret sharing scheme is described specifically. Take d as the data 8 to be protected.

Divide the data 8 into two shares like the 2-out-of-2 secret sharing. For simplicity, (r, d−r) are referred to as s1 and s2, respectively.

Two random numbers are generated locally, and take them as r1 and r2, respectively.

Provide the following share value pairs (2-tuples) for individual environments. Any value pair passed to the environment is insufficient by itself to restore the original data 8.

$(a1=s1+r1, a2=s2-r2)$ $(b1=s1+r2, b2=s2-r1-r2)$ $(c1=s1+r1+r2, c2=s2-r1)$

In this case, the original data 8 can be restored by adding each one value of the value pairs of any two environments. That is, a2+b1=s1+s2=d, a1+c2=s1+s2=d, b2+c1=s1+s2=d.

Note that generation of shares in the secret sharing is implemented not only by addition and subtraction, but may also be implemented by, for example, exclusive OR. In this case, the share is divided into (random number Q) and (original data^random number Q) (where "^" indicates exclusive OR). By recalculation, (random number Q)^(original data^random number Q)=original data. In the present specification, all expressions are based on addition and subtraction.

Overview of Secret Sharing-Based Multi-Party Computation

Secret sharing-based multi-party computation (Multi-Party Computation, MPC) is a technique for implementing secret computation using secret-shared data, and this technique is referred to as "secret sharing-based MPC" in the present specification. In the secret sharing-based MPC, functional completeness is realized by preparing an adder and a multiplier. Note that, for simplicity, the following description is based on an additive secret sharing scheme using addition and subtraction instead of exclusive OR.

Figure 3:
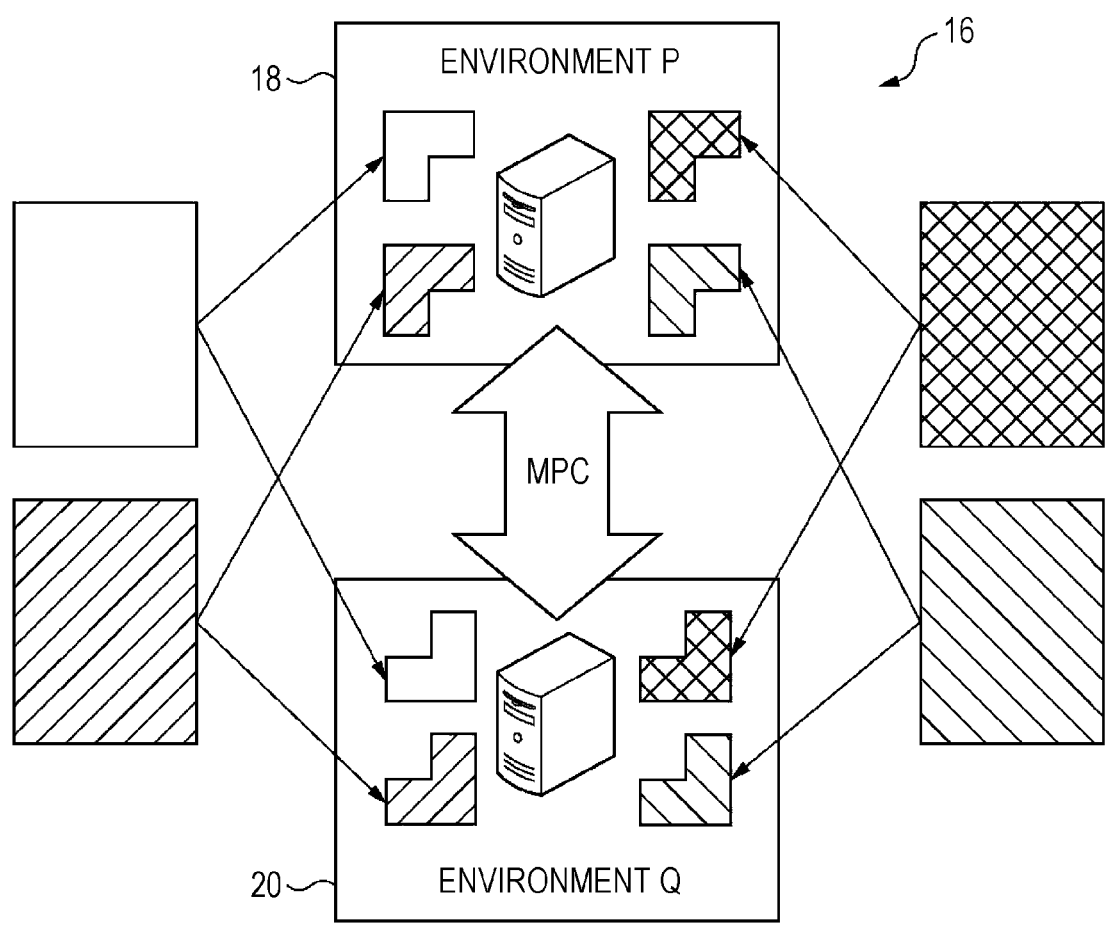
FIG. 3 is a schematic diagram of a system for realizing a secret sharing-based MPC.

FIG. 3 is a schematic diagram of a system 16 that realizes secret sharing-based MPC. In the system 16 for realizing the secret sharing-based MPC, an extremely large amount of communication occurs between devices performing calculations. In the example of FIG. 3, a large amount of communication for performing the secret computation occurs between environment P 18 and environment Q 20 that mutually have shares. Therefore, the performance of the communication is a major determinant of the performance of the secret sharing-based MPC. Here, how to reduce the number of rounds, the amount of communication, and the number of times of communication are issues. Further, other issues include how to improve the communication speed and how to parallelize the communication.

Figure 4:
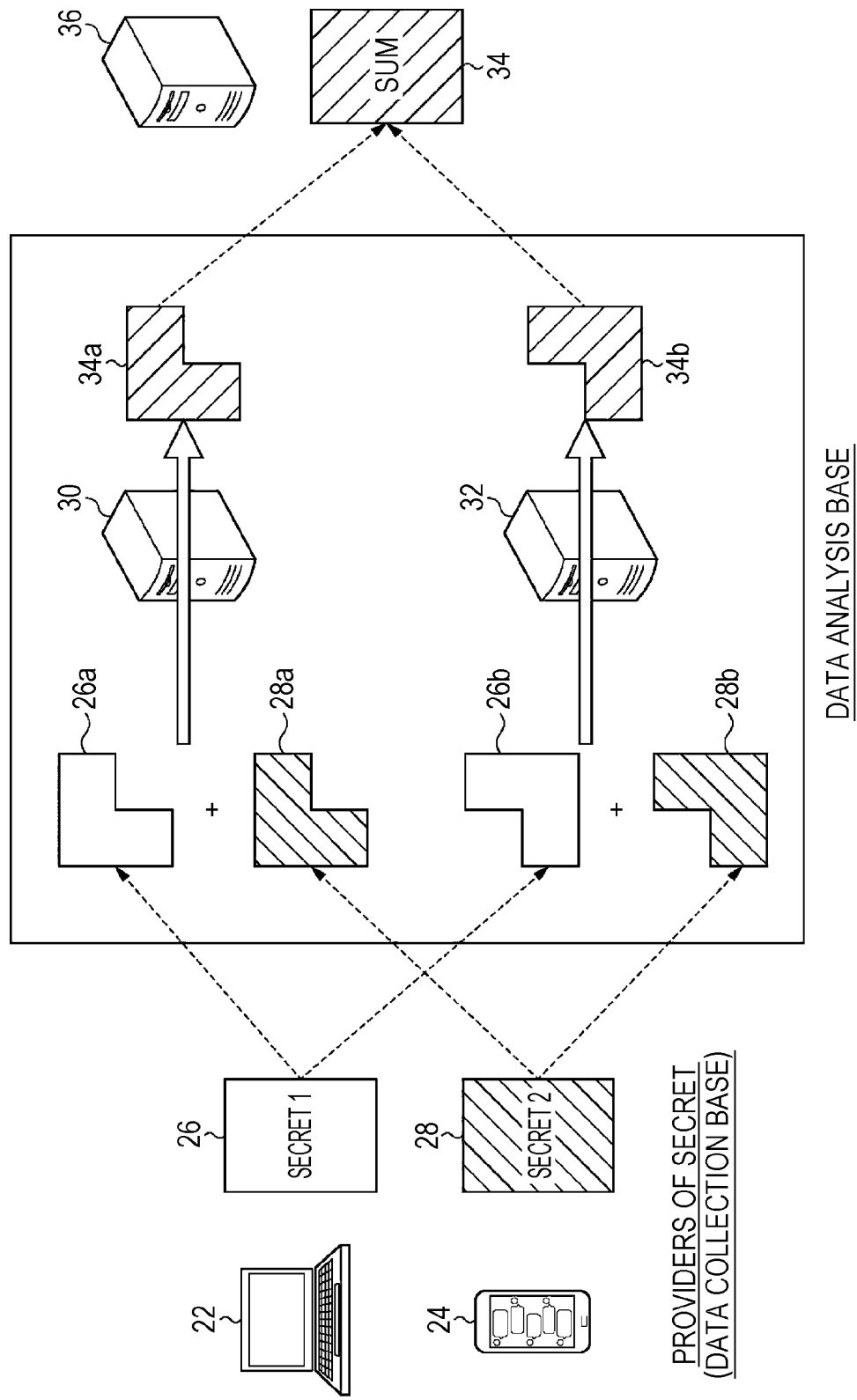
FIG. 4 is a schematic diagram for explaining processing in an adder of a secret sharing-based MPC.

FIG. 4 is a schematic diagram for explaining processing in the adder of the secret sharing-based MPC. Two clients 22 and 24 are providers of the secret (data collection base), possessing first secret data 26 and second secret data 28, respectively. The first client 22 generates two shares 26a and 26b by dividing the first secret data 26 into two, and provides (e.g., uploads) the two shares 26a and 26b, respectively, to a first device 30 (e.g., server) and a second device 32 in a data analysis base. The second client 24 generates two shares 28a and 28b by dividing the second secret data 28 into two, and provides the two shares 28a and 28b, respectively, to the first device 30 and the second device 32.

The first device 30 adds up the provided shares 26a and 28a to generate a first sum share 34a. The second device 32 adds up the provided shares 26b and 28b to generate a second sum share 34b. A device 36 of a user of the calculation result acquires and adds up the first sum share 34a and the second sum share 34b to generate sum data 34. According to the definition of shares, the sum data 34 is the sum of the first secret data 26 and the second secret data 28. Thus, the device 36 can calculate the sum of the first secret data 26 and the second secret data 28 without knowing such secret data.

Figure 5:
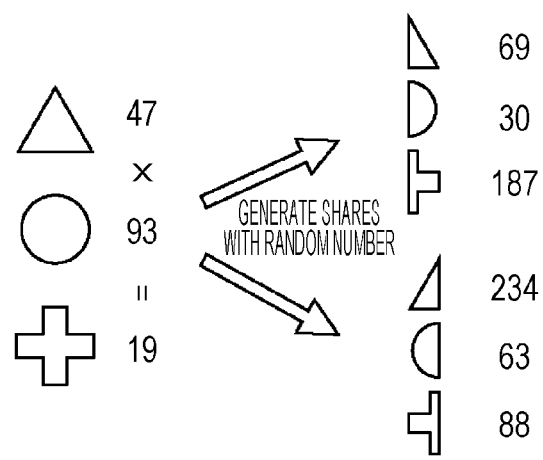
FIG. 5 is a schematic diagram illustrating an outline of Beaver's Triples used for a multiplier of the secret sharing-based MPC.

FIG. 5 is a schematic diagram illustrating an outline of Beaver's Triples used in a multiplier of a secret sharing-based MPC. Beaver's Triple (BT) is a value that is thrown away every time a multiplier is used. One set of BT is thrown away for each multiplication. Reuse is not performed, because the reuse may compromise security. BT is a ternary set of (a, b, c) that satisfies c=a×b (c is a multiplication result of a by b). In the example of FIG. 5, a=47, b=93, and c=19 in an 8-bit environment (modulus is 256). To promote understanding, c=19 because (a×b)=(47× 93)% 256=19=c, when recalculated. Shares are generated from each value of BT with a random number and are distributed to devices that perform the calculation. In the example of FIG. 5, c=19 is divided into 187 and 88. These two shares are combined, (187+88)% 256=19, thus restoring the original c=19. The same applies to a and b. Hereinafter, the stage in which BT is generated is referred to as an "offline phase". Before performing the calculation, BT may be created in advance and accumulated.

Figure 6:
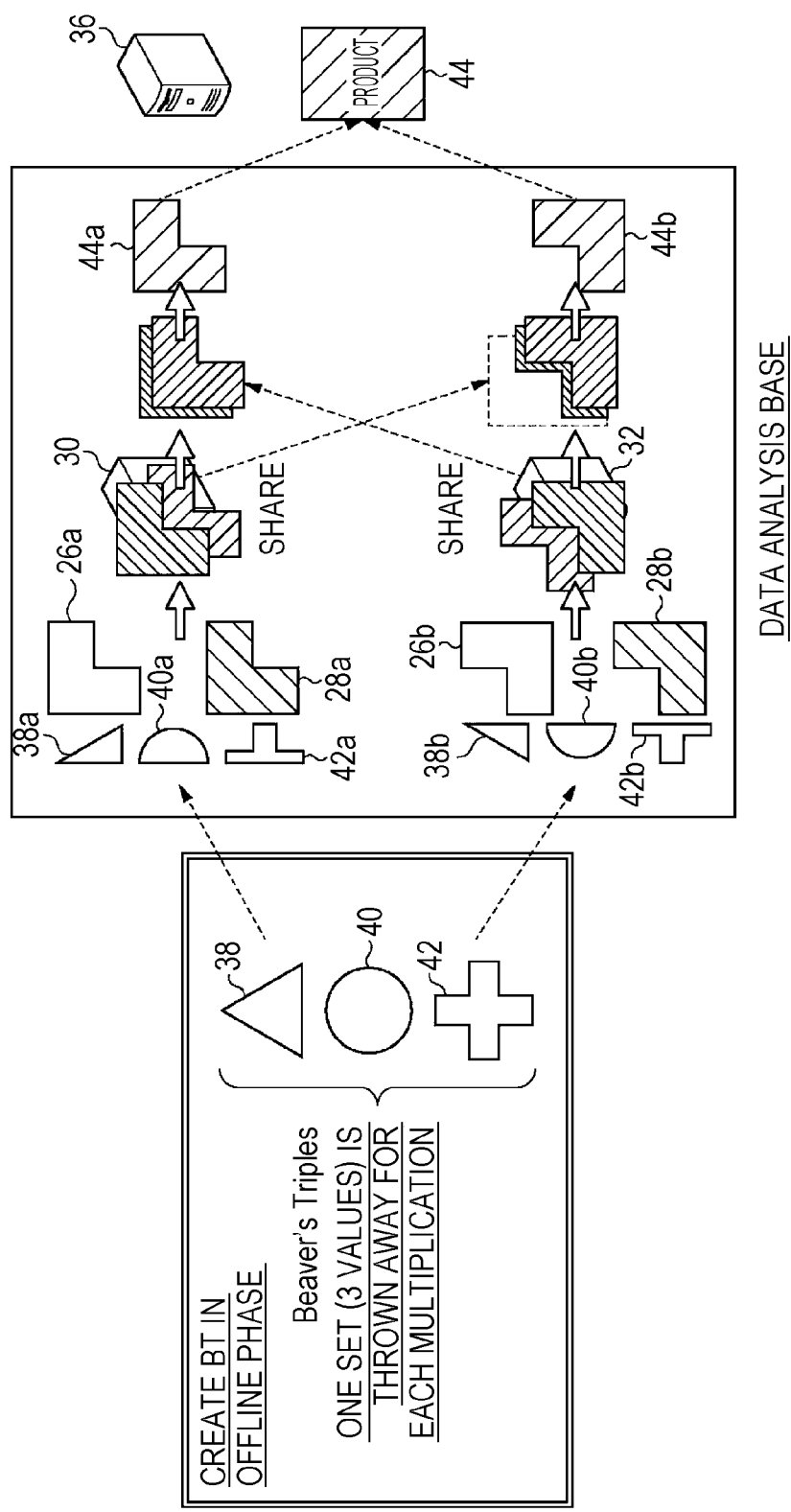
FIG. 6 is a schematic diagram for explaining processing in a multiplier of the secret sharing-based MPC.

FIG. 6 is a schematic diagram for explaining processing in the multiplier of the secret sharing-based MPC. By generating BT in the offline phase, a set of three values 38, 40, ad 42 is generated as BT.

The first client generates two shares 26a and 26b by dividing the first secret data into two, and provides the two shares 26a and 26b, respectively, to the first device 30 and the second device 32 in the data analysis base. The second client generates two shares 28a and 28b by dividing the second secret data into two, and provides the two shares 28a and 28b, respectively, to the first device 30 and the second device 32. In addition, the first device 30 acquires the shares 38a, 40a, and 42a of BT, and the second device 32 acquires the corresponding shares 38b, 40b, and 42b of BT.

Figure 23:
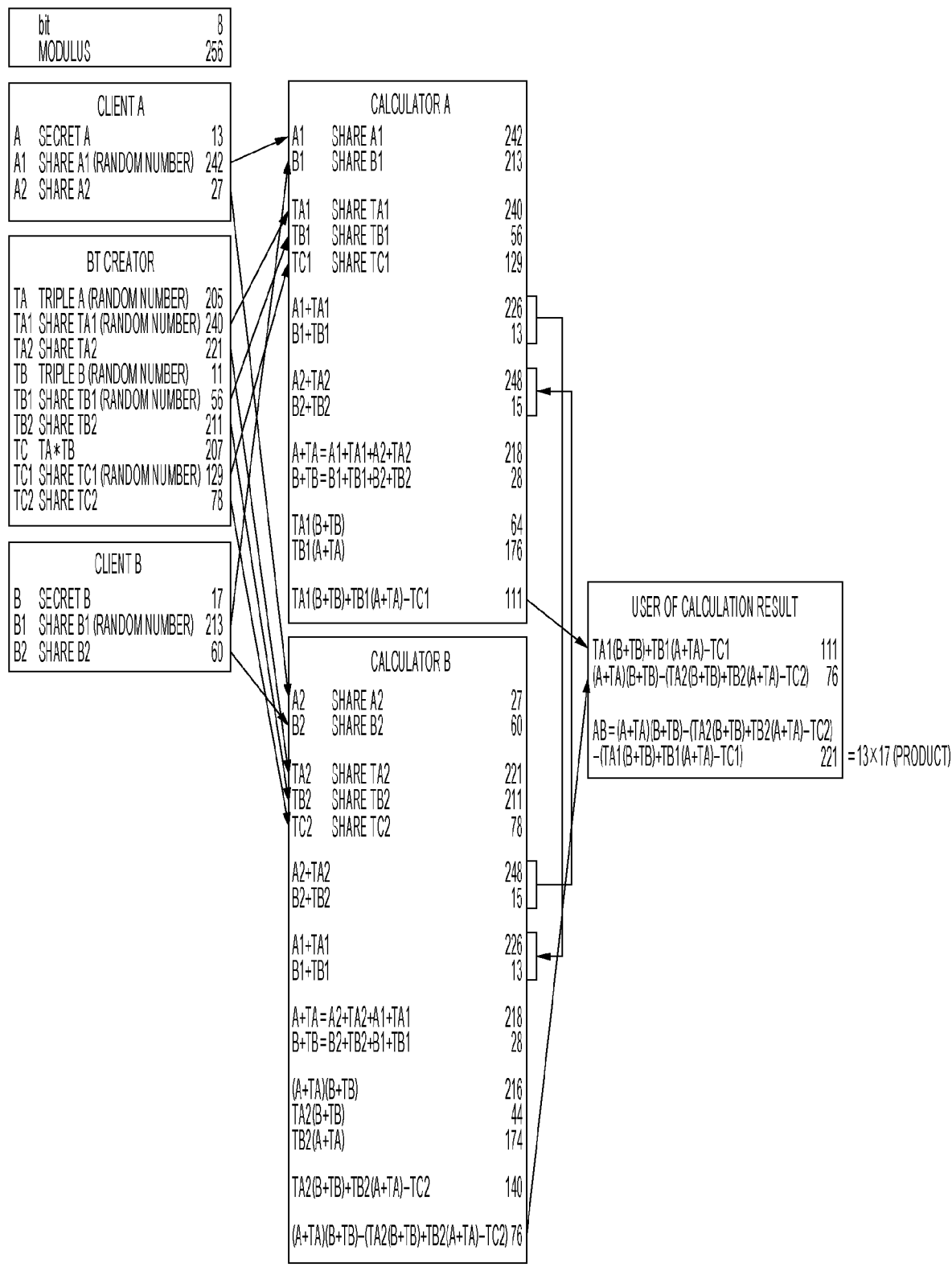
FIG. 23 illustrates an example of the calculation process of the multiplier.

As illustrated in FIG. 23, the first device 30 generates a first product share 44a by performing predetermined processing including communication with the second device 32 on the provided shares 26a, 28a, 38a, 40a, and 42a. The second device 32 generates a second product share 44b by performing predetermined processing including communication with the corresponding first device 30 on the provided shares 26b, 28b, 38b, 40b, and 42b. The first device 30 and the second device 32 communicate with each other during the above-described arithmetic processing, and have an intermediate value in common. The device 36 of a user of the calculation result generates product data 44 from the first product share 44a and the second product share 44b. Thus, the device 36 can calculate the product of the first secret data and the second secret data without knowing them.

Secret Sharing-Based MPC Implementation Model

The model that generates BT can be categorized in several kinds. For example, consider a device which has a share value of data to be protected on one hand, and consider a third-party device which does not have the share value of the data to be protected but helps BT generation or calculation on the other hand. Then the model can be classified broadly depending on where each device applies its role.

A model that generates BT only between two parties (e.g., by oblivious transfer or homomorphic encryption). This model is relatively expensive in cost in terms of computational complexity and communication. However, this model is more robust than a client-aided model and a server-aided model, which will be described below, because the confidentiality of the 2-out-of-2 secret sharing is protected.

Client-Aided model, i.e., a model in which a third-party client generates BT. This model delegates authority of BT generation to a client which is a provider itself of data. It is sometimes viewed that the more the number of clients participate, the more decentralized it becomes, and the computational load for generating BT is also distributed. As will be described below, the secret can be leaked when two out of three parties including the client betray (=cooperate in the attack). In other words, the confidentiality lessens compared to the model that generates BT only between two parties.

Server-Aided model, i.e., a model in which a third-party server generates BT. In this model, the authority to generate BT is delegated to a third party in addition to the two parties that perform calculation. Like the client-aid model, the secret can be leaked when two out of three parties including the server betray. In other words, the confidentiality lessens compared to the model that generates BT only between two parties.

Figure 7:
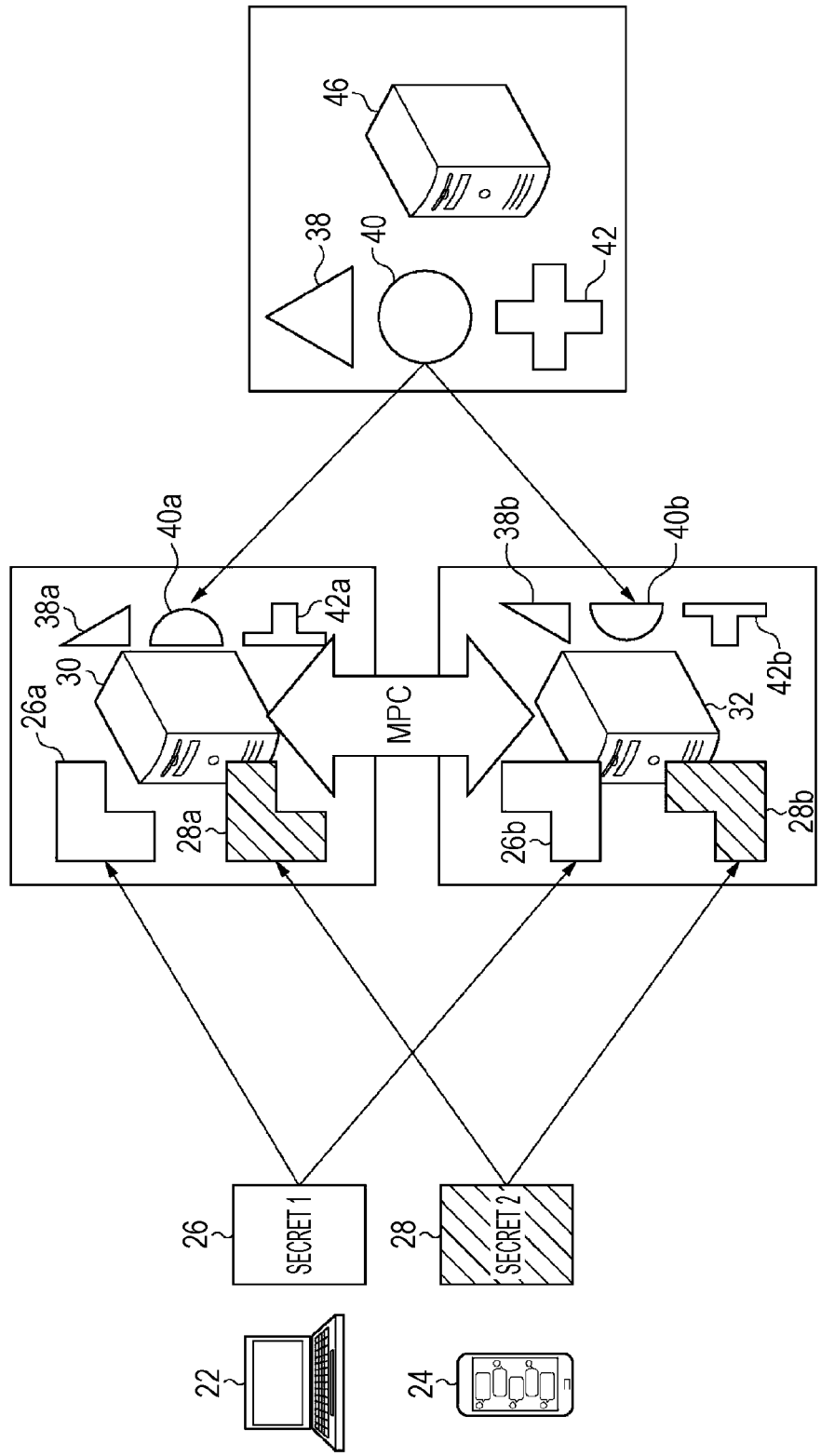
FIG. 7 is a schematic diagram illustrating an outline of a server-aided model.

FIG. 7 is a schematic diagram illustrating an outline of a server-aid model. In the server-aid model, a server 46 located in a third-party environment different from the first device 30 and the second device 32 generates a BT (a set of values 38, 40, and 42). The server 46 generates shares from the created BT, and provides one of the shares to the first device 30 and the other of the shares to the second device 32.

Figure 8:
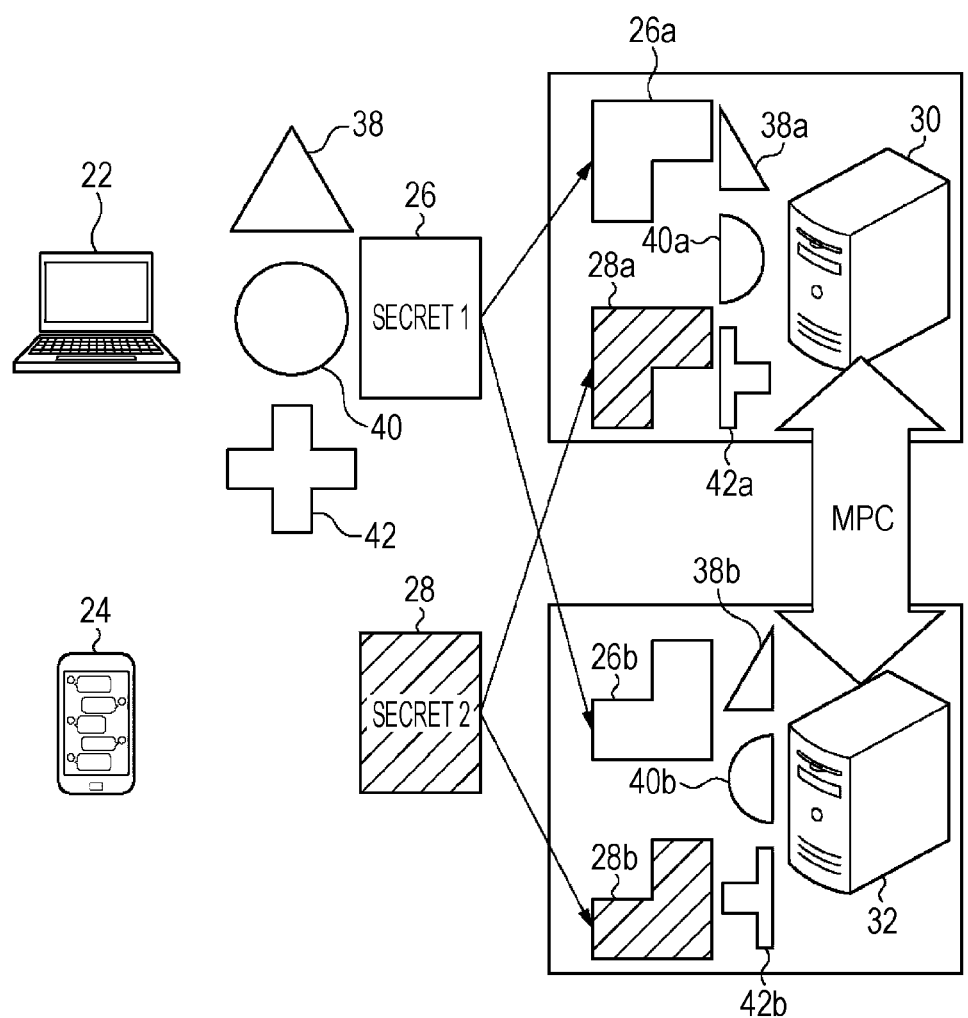
FIG. 8 is a schematic diagram illustrating an outline of a client-aided model.

FIG. 8 is a schematic diagram illustrating an outline of the client-aid model. In the client-aid model, the first client 22 is authenticated by both the first device 30 and the second device 32. The authenticated first client 22 generates BT (a set of values 38, 40, and 42). The first client 22 generates shares from the created BT, and provides one of the shares to the first device 30 and provides the other of the shares to the second device 32.

Conditions for Protecting Security of Secret Sharing-Based MPC

In the secret sharing-based MPC, there are two kinds of patterns in which the original data is restored, that is, patterns in which leakage occurs.

FIG. 9 is a schematic diagram illustrating a first pattern in which leakage occurs. In the first pattern, an attacker gathers both shares and restores the original data. For example, the attacker acquires two shares (value: 189 and value: 80) generated by dividing the original data (value: 13) by unauthorized means. By combining these shares ((189+80)% 256=13), the attacker can restore the original data.

Figure 24:
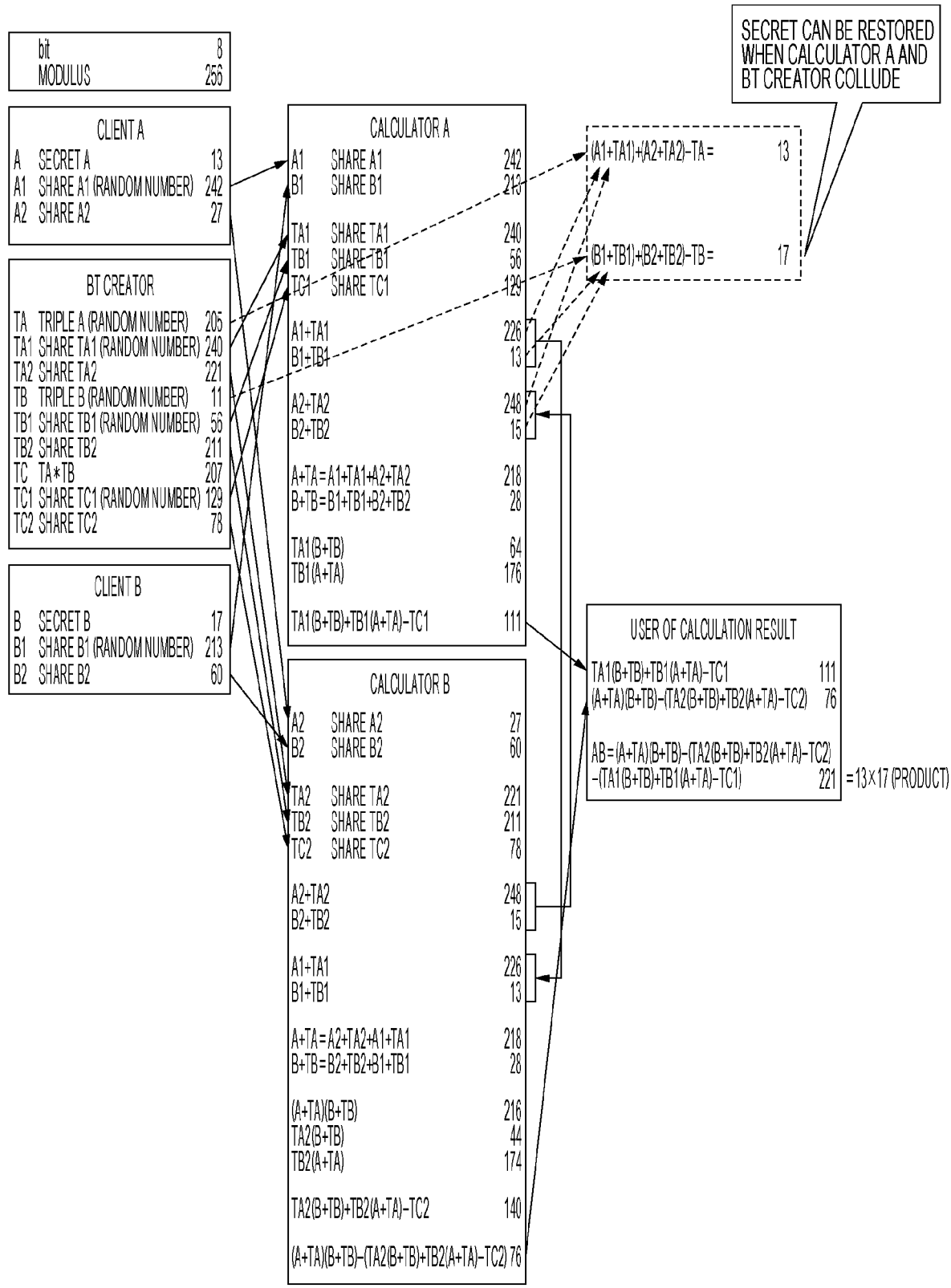
FIG. 24 illustrates supplemental information to FIG. 10.

FIG. 10 is a schematic diagram illustrating a second pattern in which leakage occurs. In the second pattern, in the multiplication process, the attacker collects BT and the multiplication process and restores the original data. In one example, FIG. 24 specifically illustrates a secret restoration that occurs when a BT creator and the environment A collude. The numerical values in FIGS. 10 and 24 are based on the numerical values in FIG. 23.

Assume that original data 1 (value: 13) is divided into share 1-1 (random value: 242) and share 1-2 (random value: 27), and original data 2 (value: 17) is divided into share 2-1 (random value: 213) and share 2-2 (value: 60). BT3 (random value: 11) is divided into share 3-1 (random value: 56) and share 3-2 (value: 211), BT4 (random value: 205) is divided into share 4-1 (random value: 240) and share 4-2 (value: 221), and BT5 (value: 207) is divided into share 5-1 (random value: 129) and share 5-2 (value: 78). The attacker obtains the sum of share 1-1 and BT3-1 ((242+56)% 256=42) and the sum of share 1-2 and BT3-2 ((27+211)% 256=238), the sum of share 2-1 and BT4-1 ((213+240)% 256=197), the sum of share 2-2 and BT4-2 ((60+221)% 256=25), which are obtained in the calculation process, as well as BT3 and BT4. At this time, from a total sum of the sum of share 1-1 and BT3-1 (calculation result: 42) and the sum of share 1-2 and BT3-2 (calculation result: 238), BT3 (value: 11) is subtracted to provide a difference ((42+238−11)% 256=13)), and, thus, the original data 1 (value: 13) can be restored. Similarly, from a total sum of the sum of share 2-1 and BT4-1 (calculation result: 197) and, the sum of share 2-2 and BT4-2 (calculation result: 25), BT4 (value: 205) is subtracted to provide a difference ((197+25−205)% 256=17)), and, thus, the original data 2 (value: 17) can be restored.

The case where any of these two patterns is satisfied is a case where two out of three parties including the BT creator betray in the client-aided model and the server-aided model. In case of a model in which BT is generated only between two parties, two out of two parties betray.

Concept of Secret Sharing-Based MPC According to Embodiment

In the secret sharing-based MPC according to an embodiment, as a countermeasure against leakage of secret due to collusion of participants in the calculation, the share value is periodically updated in each environment that participates in the secret sharing-based MPC. This enhances security and traceability.

Figure 11:
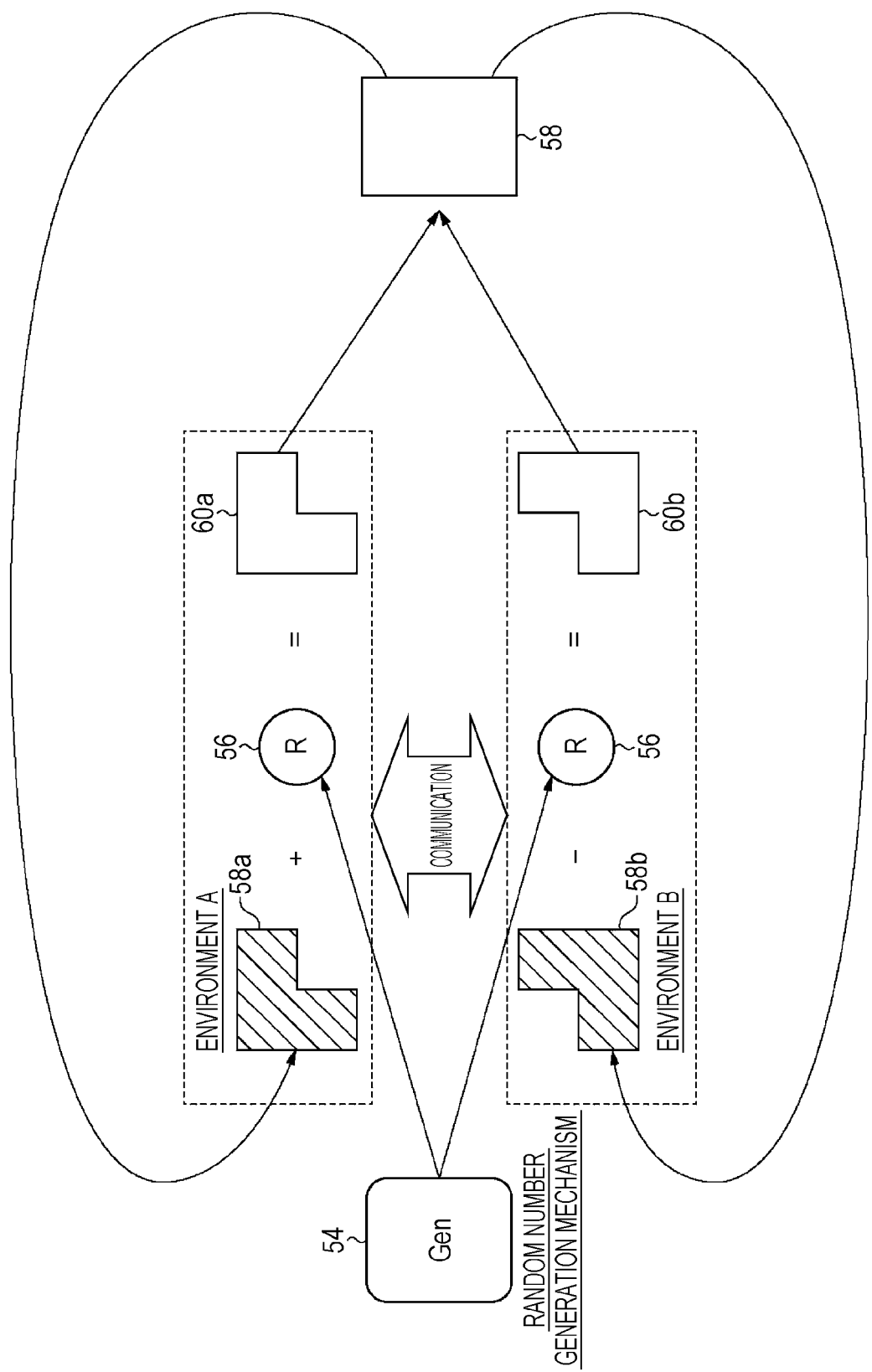
FIG. 11 is a schematic diagram for explaining the concept of secret sharing-based MPC according to the embodiment.

FIG. 11 is a schematic diagram for explaining the concept of secret sharing-based MPC according to the embodiment. In the present embodiment, a random number generation mechanism 54 that periodically generates (e.g., at regular intervals) a random number 56 is provided. The random number 56 generated by the random number generation mechanism 54 is different from the random number for generating shares as described with reference to FIGS. 1 and 2, and is also different from BT. Hereinafter, the random number 56 generated by the random number generation mechanism 54 is referred to as a share-updating random number.

Figure 25:
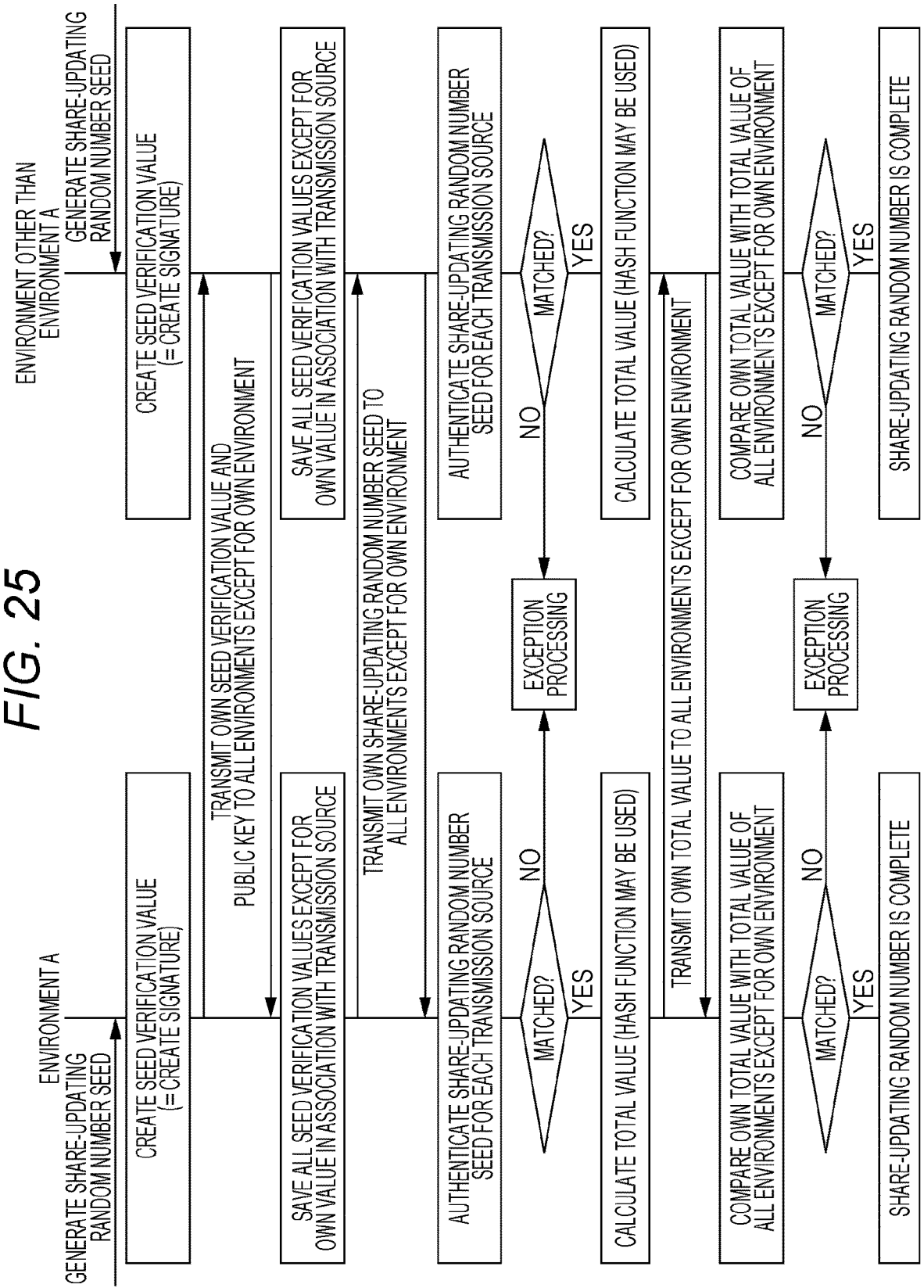
FIG. 25 illustrates generation of random numbers between two parties (a flow from a viewpoint of environment A).

FIG. 25 illustrates an example of a method of implementing the random number generation mechanism 54. This is implemented among all environments each having a share value necessary for decryption. The range is defined, according to the embodiment of FIG. 11, such that "all" represents environment A and environment B, "all except for own environment" for environment A represents environment B, and "all except for own environment" for environment B represents environment A. All devices randomly select numbers (generate random values) by themselves. The number determined at this time is referred to as a share-updating random number seed. After generating a public key and a secret key of the public key cryptography (asymmetric key cryptography), the share-updating random number seed is subjected to irreversible processing such as a hash function, and an output value returned is signed with the secret key. A pair of the signed value and the public key is referred to as a seed verification value.

First, the seed verification value is transmitted to all devices other than own device. After receiving the seed verification values from all the devices except for own device, each seed verification value is held in association with a transmission source. A device having received the seed verification value from all devices other than own device transmits its own share-updating random number seed to all devices other than own device. The device that has received all the share-updating random number seeds other than its own seed authenticates the received share-updating random number seeds with the public key of the seed verification value sent from the same transmission source.

If at least one authentication fails, exception processing starts. As an example of the exception processing, for example, share updating processing may be stopped.

Conversely, if all authentications are successful, all the received share-updating random seeds are summed. A total value or an output value obtained by applying the irreversible processing such as the hash function to the total value is referred to as a provisional share-updating random number. The provisional share-updating random number is provided to all devices other than itself. At the same time, the provisional share-updating random numbers are received from all devices other than own device. If all provisional share-updating random numbers match, this value is formally used as the share-updating random number for the next update.

An alternative to the procedure so far is described. It may be possible to generate the share-updating random number by party K among all environments (K is an integer equal to or more than 1 and less than N) or by another environment, for example, a device having an assisting role in generating and calculating BT. However, if the environment of party K or other environments collude and the sum of the share values linked to the secret to be attacked is set to an arbitrary value (e.g., 0) on the device of party K, then the secret can be decrypted by combining the shares of the remaining (N−K) environments. Taking FIG. 11 as an example, if the share on the environment A is able to be set intentionally to 0, the share on the environment B can be made equivalent to the original data (=secret). In other words, if the attacker on the environment A side informs someone on the environment B side before the update of the share that the secret is to be restored on the environment B after the next update of the share, the attacker on the environment B side can obtain the secret, after the next update of the share, simply by accessing the environment B side. This situation is inconvenient because it is possible to realize the situation where the secret could leak only by accessing the environment in which the secret is restored by the intention of the attacker and, thus, the traceability using the access history, which will be described below, can be invalidated. Therefore, it is recommended to generate the random value that is inoperable by the intention of the less than N environments. Although the random value has been agreed for all N, similar attack is indeed possible as in the example described above, if there is an attacker who can operate the random number in each of the N environments. Therefore, it is most desirable that the random number acquired by means to which the parties concerned possessing shares are equally accessible and the intentions of the parties concerned possessing the shares hardly intervene is used in a predetermined calculation (e.g., addition and subtraction) with the sum of the share-updating random number seeds. For example, as illustrated in FIG. 26, if direct connection to the Internet is permitted from all environments, it is possible to use some means to acquire a random number from a hash value of a transaction held by a public chain such as the Ethereum. To provide unpredictability on the share-updating random number, all environments are allowed to acquire random numbers from a future Block Height rather than receiving the seed verification values, and after a few blocks (confirmations) have passed from the Block Height, all environments transmit and receive the share-updating random number seeds.

Having the above concerns admitted, if the operation that allows tracking the access even when the accesses occurs simultaneously at less than T points out of N points, it is possible to use the random number generation means with which the environments less than N can agree.

The original data 58 is divided into two shares 58a and 58b which are shared by environment A and environment B, respectively, for secret distribution. The random number generation mechanism 54 allows the environment A and the environment B to obtain the same share-updating random number 56 at predetermined timing. The environment A and the environment B that have obtained the share-updating random number 56 communicate with each other and confirm the share-updating random number 56. In other words, by confirming the share-updating random number among all environments that have shares, data corruption due to mismatch of the share-updating random numbers 56 can be prevented.

In the environment A, a new share 60a is generated by adding the share-updating random number 56 to the share 58a as share update processing. In the environment B, a new share 60b is generated by subtracting the share-updating random number 56 from the share 58b as share update processing. Adding up the new share 60a of the environment A and the new share 60b of the environment B cancels the influence of the share-updating random number 56 and restores the original data 58. That is, share 60a+share 60b=(share 58a+share-updating random number 56)+(share 58b−share-updating random number 56)=share 58a+share 58b=original data 58.

Thus, even if the share is updated by the share-updating random number 56, the original data is not damaged, and the secret sharing-based MPC does not suffer.

In the secret sharing-based MPC according to the present embodiment as illustrated in FIG. 11, it is impossible to reveal the secret unless the attack is performed on both the environment A and the environment B simultaneously, particularly during the same period (i.e., a period from adding/subtracting timing using the same share-updating random number 56 to occurrence of the next update). This imposes strong constraints on the attack.

Figure 12:
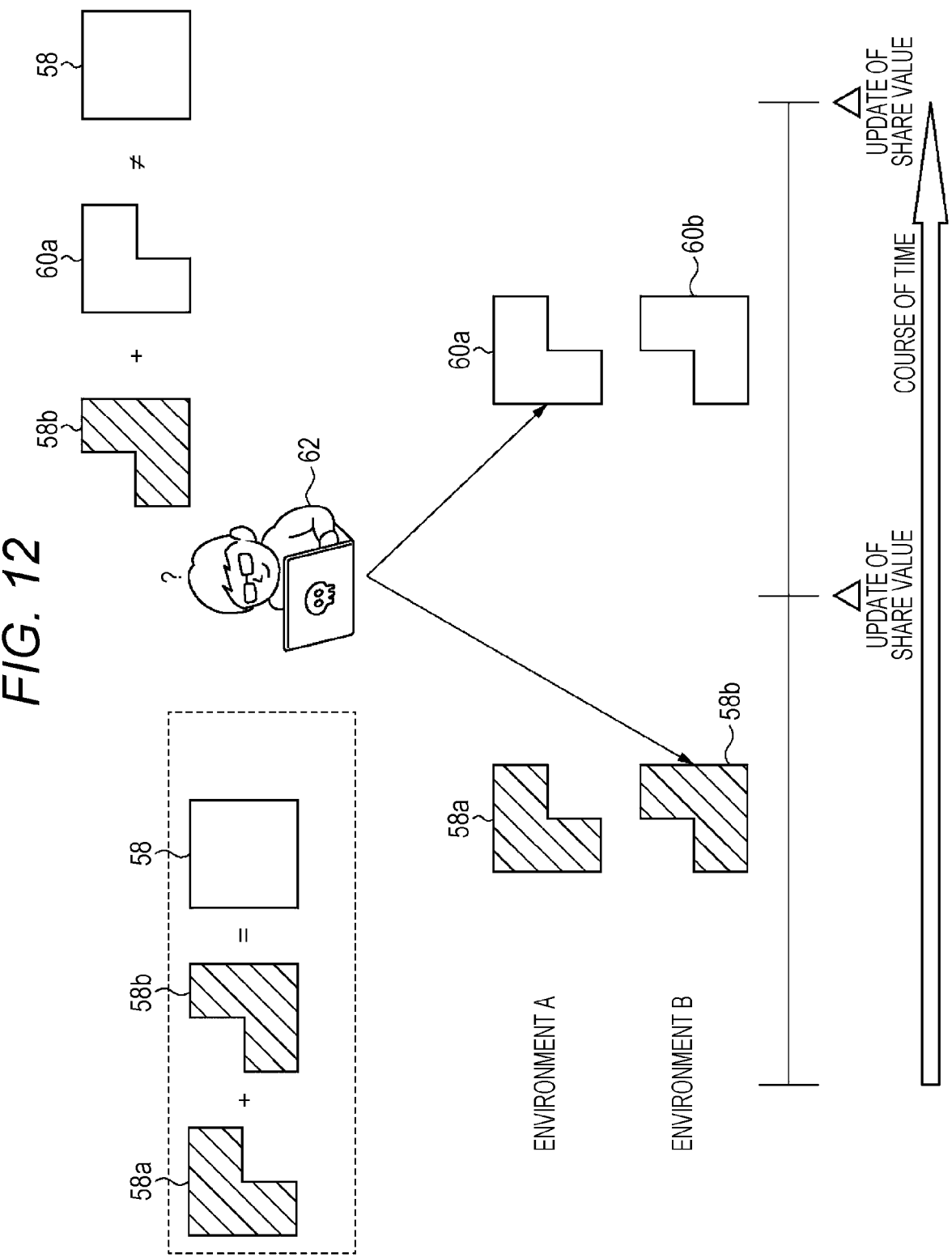
FIG. 12 is a schematic diagram illustrating the basis of security of the secret sharing-based MPC according to the present embodiment.

FIG. 12 is a schematic diagram illustrating the security grounds of the secret sharing-based MPC according to the present embodiment. Assume that an attacker 62 succeeds in attacking the environment B at certain timing and acquires the share 58b that the environment B possesses at that timing. Then, assume that the attacker 62 succeeds in attacking the environment A at another timing straddling the update of the share value and acquires the share 60a that the environment A possesses at the other timing. The attacker 62 attempts to restore the original data 58 from the acquired two shares 58b and 60a, but the restoration does not succeed because of the update of the share value with the share-updating random number 56. Thus, in the secret sharing-based MPC according to the present embodiment, the original data cannot be restored if timing of the leakage is sufficiently shifted, even though both shares have been leaked.

Figure 13:
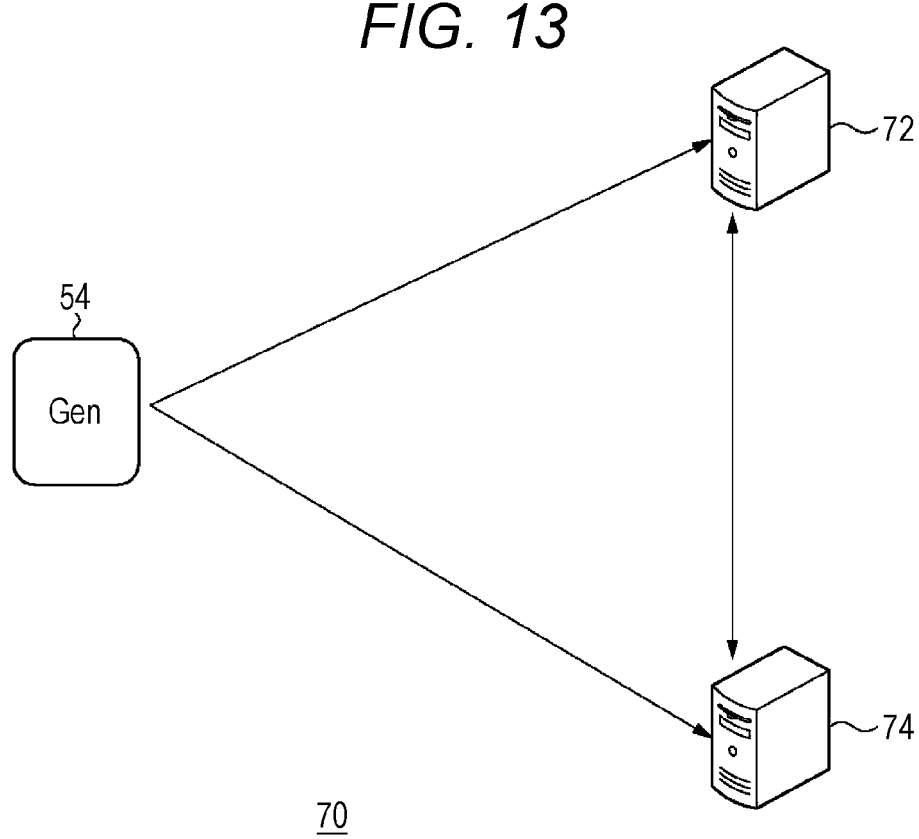
FIG. 13 is a schematic diagram illustrating a configuration of a secret sharing-based MPC system according to the embodiment.

Detailed Description of System Realizing Secret Sharing-Based MPC According to Embodiment FIG. 13 is a schematic diagram illustrating a configuration of a secret sharing-based MPC system 70 according to the embodiment. The secret sharing-based MPC system 70 includes the random number generation mechanism 54, an environment A device 72 provided in environment A, and an environment B device 74 provided in environment B. The random number generation mechanism 54, the environment A device 72, and the environment B device 74 communicate via a network such as the Internet. Although not illustrated in FIG. 13, those skilled in the art would appreciate that secret sharing-based MPC system 70 may include other components such as clients.

Environment A and environment B are different. For example, environment A and environment B may each be a group of cloud servers, each group being managed and operated by an individual entity. Both environment A device 72 and environment B device 74 participate in the secret sharing-based MPC according to the embodiment. The original data can be restored by combining the share of the environment A device 72 and the corresponding share of the environment B device 74, but the above mechanism realizes the secret sharing that cannot be restored with only one share.

Figure 14:
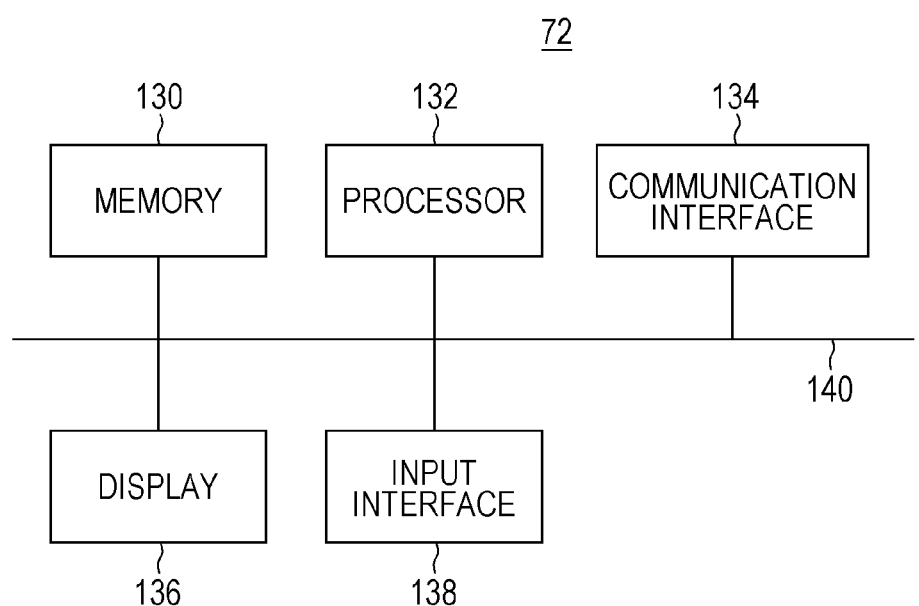
FIG. 14 is a hardware configuration diagram of an environment A device of FIG. 13.

FIG. 14 is a hardware configuration diagram of the environment A device 72 in FIG. 13. The environment B device 74 and the random number generation mechanism 54 may have the same hardware configuration as the hardware configuration illustrated in FIG. 14. The environment A device 72 includes a memory 130, a processor 132, a communication interface 134, a display 136, and an input interface 138. These elements are each connected to a bus 140 and communicate with each other via the bus 140.

The memory 130 is a storage area for storing data and programs. The data and programs may be stored in the memory 130 permanently or temporarily. The processor 132 implements various functions in the environment A device 72 by executing a program stored in the memory 130. The communication interface 134 is an interface with external components for transmitting and receiving data to and from the environment A device 72. For example, the communication interface 134 includes an interface for accessing a network, and exchanges data with the environment B device 74 and the random number generation mechanism 54 via the network. The display 136 is a device for displaying various kinds of information, and is, for example, a liquid crystal display or an organic electroluminescence (EL) display. The input interface 138 is a device for receiving an input from the user. The input interface 138 includes, for example, a mouse, a keyboard, or a touch panel provided on the display 138.

Figures 15, 16:
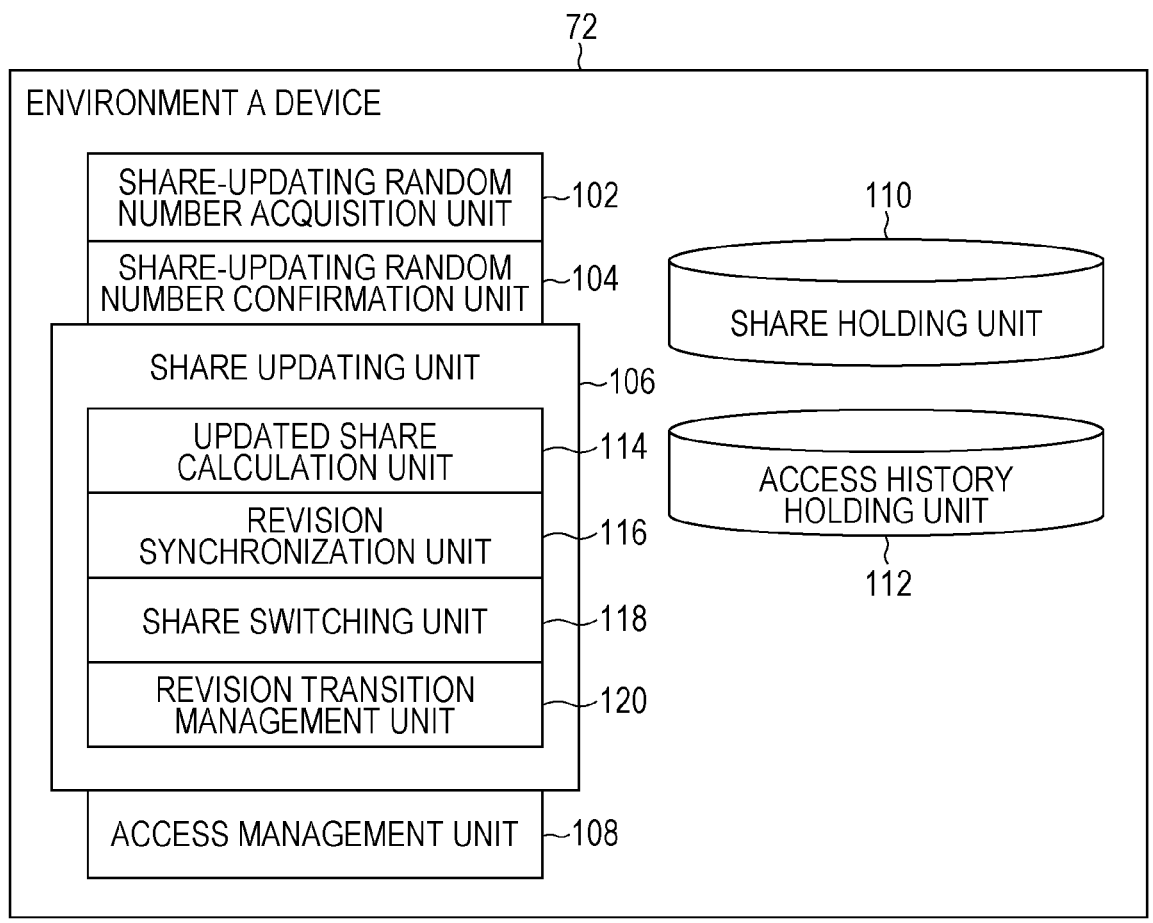
FIG. 15 is a block diagram illustrating functions and a configuration of the environment A device of FIG. 13.
FIG. 16 is a data structure diagram illustrating an example of a share holding unit in FIG. 15.

FIG. 15 is a block diagram illustrating functions and a configuration of the environment A device 72 in FIG. 13. Blocks illustrated here can be implemented by elements and mechanical devices including a CPU of a computer in terms of hardware, and, in terms of software, the blocks can be implemented by a computer program and the like. Functional blocks as illustrated herein are implemented by cooperation thereof. Therefore, it is to be understood by those skilled in the art that these functional blocks can be achieved in various forms by combinations of hardware and software. The environment B device 74 includes the same function and configuration as the function and configuration of the environment A device 72 illustrated in FIG. 15.

The environment A device 72 includes a share-updating random number acquisition unit 102, a share-updating random number confirmation unit 104, a share updating unit 106, an access management unit 108, a share holding unit 110, and an access history holding unit 112.

FIG. 16 is a data structure diagram illustrating an example of the share holding unit 110 in FIG. 15. The share holding unit 110 holds a share ID indicating a correspondence relationship between shares, a share value, and a revision number which is a value specifying a revision of the share with each other, these values together indicating the correspondence relationship in the secret sharing-based MPC system 70, by associating these values with each other. The revision number of the share may be such that a plurality of shares always holds the same revision number, or the revision number may be managed for each share. In the secret sharing-based MPC system 70, the same share ID is assigned to each of two or more shares generated by dividing original data in the client that is a provider of the secret. Therefore, the fact that the share IDs of the shares match indicates that the shares are corresponding shares generated by dividing the same original data. In the example of FIG. 1, the shares 4 and 6 generated by dividing the original data 2 have the same share ID (for example, "SH01"). The revision number is updated each time the share is updated. It is recommended that the revision number be updated in an incrementing manner or in a one-way manner such as by the hash function. In the following, the update is expressed in the incrementing manner for simplicity in the present specification.

FIG. 17 is a data structure diagram illustrating an example of the access history holding unit 112 in FIG. 15. The access history holding unit 112 holds the revision number at the access timing for each share held in the share holding unit 110 by associating the revision number of the share and access information to the share of the revision number. The access information includes the user ID for specifying the user who has accessed the share in the example of FIG. 17. In the access history holding unit 112, each time the share-updating random number is updated, that is, each time the share is updated, an entry having the updated revision number is added.

Returning to FIG. 15, the share-updating random number acquisition unit 102 acquires the share-updating random number from the random number generation mechanism 54. The random number generation mechanism 54 updates the share-updating random number periodically, for example, every hour, every 8 hours, every 12 hours, every day, and the like. Each time the random number generation mechanism 54 updates the share-updating random number, the share-updating random number thus updated is acquired by the share-updating random number acquisition unit 102.

Note that the share-updating random number may be updated on the basis of a predetermined rule, and may be updated at irregular intervals instead of periodical update. Attacks are more difficult when the update cycle of the share-updating random number (=share update cycle) is irregular.

The share-updating random number confirmation unit 104 verifies the validity of the share-updating random number acquired by the share-updating random number acquisition unit 102. When the share-updating random number acquisition unit 102 acquires the share-updating random number, the share-updating random number confirmation unit 104 communicates with the share-updating random number confirmation unit of the environment B device 74 via the network, and determines whether the share-updating random number acquired by the environment A device 72 and the share-updating random number acquired by the environment B device 74 are matched. If the match is determined, the share-updating random number confirmation unit 104 passes the processing to the share updating unit 106. If no match is determined, the share-updating random number confirmation unit 104 executes predetermined abnormality processing of the share-updating random number generation.

The share updating unit 106 updates the share of the environment A device 72 held in the share holding unit 110 on the basis of the share-updating random number acquired by the share-updating random number acquisition unit 102. The share updating unit 106 is designed to perform update in a manner that the share of the environment A device 72 updated on the basis of the acquired share-updating random number is combined with the environment B device 74 updated on the basis of the share-updating random number to cancel the influence of the share-updating random number and restore the original data.

In the present embodiment, the share-updating random number is added to the share of the environment A device 72, while the share-updating random number is subtracted from the corresponding share of the environment B device 74, thus cancelling the influence of the share-updating random number (see FIGS. 11 and 12). The share value and the share-updating random number before the update need to be discarded immediately, once the update has been performed successfully in all environments and these values are no longer necessary in the post processing, from all the environment A devices 72 to disable restoration. If the share-updating random number acquisition unit 102 acquires another share-updating random number updated other than the one that has been discarded, the share updating unit 106 further updates the share, which has already been updated with the share-updating random number before the update, on the basis of the updated share-updating random number.

The performing role in calculation is determined by predetermined means, such as addition in the environment A and subtraction in the environment B. Any means by which the operation content performed through the update of shares is cancelled (zero sum) is available. For example, in a situation where secret sharing is performed by three environments, it may be determined that the adding role is assigned to one environment and the subtracting role is assigned to two environments, and the environment of the adding role is set to add twice the share-updating random number. As a result, the entire share update is (share-updating random number×2)−(share-updating random number+share-updating random number)=0.

The share updating unit 106 performs, by communicating with the environment B device 74, processing to match the share revision number of the environment A device 72 updated on the basis of the acquired share-updating random number with the corresponding share revision number of the environment B device 74 updated on the basis of the same share-updating random number. By confirming the completion of the update of the share value in each device and managing the revision for each update, it is possible to make the share unique after the update.

The share updating unit 106 includes an updated share calculation unit 114, a revision synchronization unit 116, a share switching unit 118, and a revision transition management unit 120. Further details of the share updating unit 106 will be described below with reference to FIG. 18.

The access management unit 108 manages access to shares held in the share holding unit 110. The access management unit 108 receives an access request to the share held in the share holding unit 110 from the user via the input interface 138 or via the network. The access management unit 108 performs user authentication of the requesting user, and rejects access if the authentication fails. When the authentication is successful, the access management unit 108 reads the share specified by the received access request from the share holding unit 110 and provides the share to the request source. In addition, the access management unit 108 associates the revision number of the provided share with the user ID of the user to which the share is provided, and registers the revision number and the user ID in the access history holding unit 112.

Operation of the secret sharing-based MPC system 70 having the above configuration is described.

Figure 18:
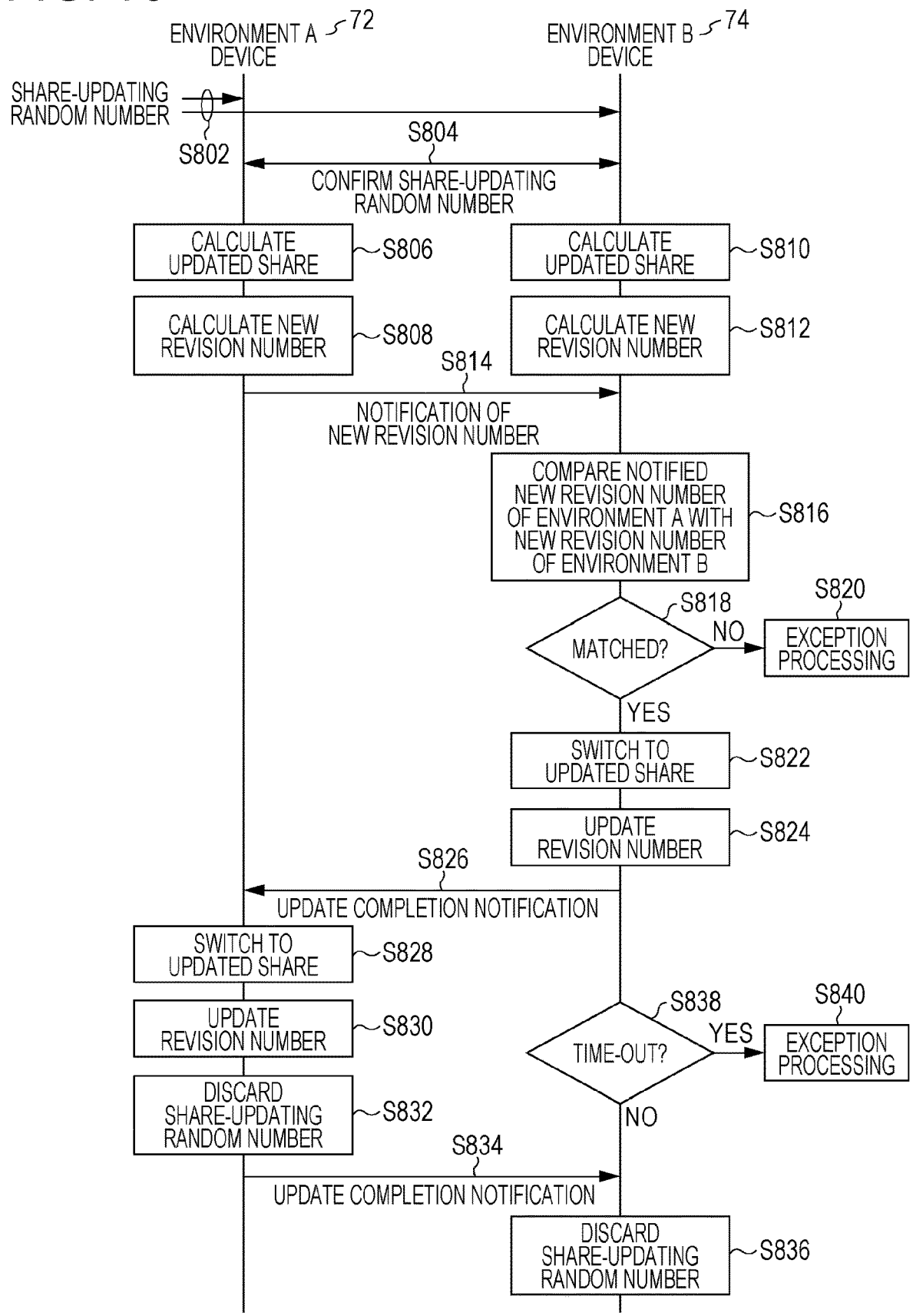
FIG. 18 is a chart illustrating a series of processing steps in the secret sharing-based MPC system of FIG. 13.

FIG. 18 is a chart illustrating a series of processing steps in the secret sharing-based MPC system 70 of FIG. 13. The share-updating random number acquisition unit 102 of the environment A device 72 and the share-updating random number acquisition unit of the environment B device 74 each acquire the share-updating random number generated or updated by the random number generation mechanism 54 (S802). The share-updating random number confirmation unit 104 of the environment A device 72 communicates with the share-updating random number confirmation unit of the environment B device 74 to confirm the share-updating random number acquired in step S802 (S804). The updated share calculation unit 114 of the share updating unit 106 of the environment A device 72 reads the share ID and the current share value of the share held in the share holding unit 110, and adds the read share value to the share-updating random number acquired in step S802 to calculate the updated share (S806). In addition, the updated share calculation unit 114 reads the current revision number of the share value read in step S806 from the share holding unit 110, and increments the read revision number (or determines the next revision number by hash calculation using the hash function) to calculate a new revision number (S808). Similarly, the updated share calculation unit of the share updating unit of the environment B device 74 reads the share ID and the current share value of the share held in the share holding unit of the environment B device 74, and subtracts, from the read share value, the share-updating random number acquired in step S802 to calculate the updated share (S810). In addition, the updated share calculation unit reads the current revision number of the share value read in step S810 from the share holding unit, and increments the read revision number (or determines the next revision number by hash calculation using the hash function) to calculate a new revision number (S812).

The revision synchronization unit 116 of the share updating unit 106 of the environment A device 72 notifies the revision synchronization unit of the share updating unit of the environment B device 74 of the share ID of the update target share and the new revision number calculated in step S808 via the network (S814). The notification is received by the revision synchronization unit of the share updating unit of the environment B device 74. The revision synchronization unit specifies the updated share having a share ID that matches the notified share ID from among the updated shares calculated in step S810. The revision synchronization unit compares the new revision number calculated in step S812 for the specified update share with the new revision number notified in step S814 (S816).

When it is determined in step S816 that the new revision numbers do not match (N in S818), the revision synchronization unit of the share updating unit of the environment B device 74 executes predetermined exception processing (S820). For example, the revision synchronization unit may discard the updated share, and perform processing for resynchronizing the revision and updating again.

If it is determined in step S816 that the new revision numbers match (Y in S818), the share switching unit of the share updating unit of the environment B device 74 discards the old share and switches to the updated share (S822), and updates the revision number of that share with the new revision number (S824). The share switching unit specifies a share having a share ID that matches the share ID notified in step S814 from among the shares held in the share holding unit of the environment B device 74. The share switching unit discards the value of the specified share, and registers instead the updated share value (calculated in step S810) having the share ID that matches the notified share ID. In addition, the share switching unit rewrites the revision number of the specified share to a new revision number (calculated in step S812).

When the switching to the updated share is completed in the environment B device 74, the share switching unit of the share updating unit of the environment B device 74 sends an update completion notification to the share switching unit 118 of the environment A device 72 (S826). Upon receiving the update completion notification, the share switching unit 118 discards the old share and switches to the updated share (S828), and updates the revision number of the share with the new revision number (S830). The share switching unit 118 specifies an update target share (i.e., a share having a share ID that matches the share ID notified in step S814) from among the shares held in the share holding unit 110 of the environment A device 72. The share switching unit 118 discards the specified share value and registers instead the updated share value (calculated in step S806) of the update target share. In addition, the share switching unit 118 rewrites the revision number of the specified share to a new revision number (calculated in step S808).

The share updating unit 106 of the environment A device 72 discards the share-updating random number acquired in step S802 (S832). The environment A leaves a time stamp of the update completion time in a log format. At this time, the environment A notifies the environment B that step S830 has been completed normally (S834). When the environment B receives the notification, the share updating unit of the environment B discards the share-updating random number acquired in step S802 (S836). The environment B leaves a time stamp of the update completion time in a log format.

If the notification in step S834 has not been received for a certain period of time (Y in S838), exception processing is performed (S840). For example, after communicating with the environment A and confirming the normal end on the environment A side, the share updating unit of the environment B discards the share-updating random number acquired in step S802 and returns to the normal operation. Conversely, if normal end is not confirmed, it is necessary to rewind all environments to the state before updating. For example, an operation of reverting the share to the original using the share-updating random number may be performed on the share for which the update operation has been completed. The share may be reverted to the state before the update by subtracting the share-updating random number from the share to which the share-updating random number has been added, adding the share-updating random number to the share from which the share-updating random number has been subtracted, and reverting the updated revision number to the last revision number. At the same time, the revision number of the share to which the update operation has been completed is also returned to the number before the update. The numbering of the revision number is decremented, if incremental numbering has been used. However, when a one-way numbering method such as the hash function is used as the numbering method for the revision number, the old revision number needs to be held until the normal end is confirmed. When the normal end of the share update is confirmed, the old revision number may be discarded for security purpose. The time stamp left during the update is also invalidated.

The revision transition management unit 120 of the share updating unit 106 of the environment A device 72 performs processing for preventing a mismatch between revisions of operands (=shares) of calculations performed in each device in the above-described share update procedure. Such revision mismatch may occur if, for example, the calculation is performed from the end of switching of the share on the environment B device 74 side, until the end of the share switching on the environment A device 72 side (from step S824 to step S830 in FIG. 18). Specifically, the share used for the calculation in progress in the environment A device 72 has an old revision. Measures are taken to prevent such revision mismatch. In one example, the revision transition management unit 120 performs one of the following two transition management processing steps, for example.

(No. 1) During the synchronization of the share revision, that is, from before the start of step S814 to the completion of step S830 in FIG. 18, the revision transition management unit 120 of the environment A device 72 and the revision transition management unit of the environment B device 74 stop the calculation of the environment A device 72 and the calculation of the environment B device 74, respectively, in the following manner.

Stop Procedure

First, both the environment A device 72 and the environment B device 74 stop accepting the start of the calculation process. In addition, the currently running calculation process is shared between the two devices. If there is a difference, there are two response options below:

Option 1: Complete the cooperation work of the calculation process on both devices before the stop.

Option 2: Interrupt the difference process on the device that is executing the difference process and postpone the process until after the share update.

After the completion of step S830, the revision transition management unit 120 of the environment A device 72 sends an additional notification to the revision transition management unit of the environment B device 74, and the calculation is restarted individually using the updated shares.

The transition management processing No. 1 is highly available, especially when the granularity of the calculation process is small, because the time required for digesting the remaining process is short. Also, the required communication band is smaller than in the transition management processing No. 2 described below.

(No. 2) In all calculation processes generated in each device, the revision number is associated with the share used as the operand. At the timing when the calculation occurs, the revision number is notified from the revision transition management unit 120 of the environment A device 72 to the revision transition management unit of the environment B device 74. Note that, if a multiplier is included in the series of processing steps, one or more rounds of communication occurs inherently between two devices, so that the notification may also be performed correspondingly at the communication timing.

In the environment B device 74, when the revision number of the process for cooperating the same calculation does not match the revision number notified by the environment A device 72 (i.e., when the revision number notified by the environment. A device 72 is older (because, in case of following the procedure of FIG. 18, the environment B device 74 has switched the share earlier), the notification is made from the revision transition management unit of the environment B device 74 to the revision transition management unit 120 of the environment A device 72.

The revision transition management unit 120 of the environment A device 72 that has received the notification completes the acquisition of the new revision share, and then restarts the calculation process only on the environment A device 72 side.

According to the transition management processing No. 2, the effect on availability is relatively small. For example, when the mismatch occurs, only a slight delay occurs on the environment A device 72 side. In addition, the transition management processing No. 2 is more suitable when the share update cycle is irregular. In addition, although limited to managing all shares linked to one revision number in the entire environments, if the share is used as the operand at least once and the calculation involving the occurrence of the round (e.g., multiplier) is successfully performed, it is no longer necessary to notify the opponent party of the revision number. This is because of the condition that the shares are managed with the same revision number for the whole environments. Thus, the fact that the calculation involving communication (occurrence of the round) by all environments has succeeded can verify that all shares in all environments have been updated. Instead of agreeing through the multiplier, it is possible to set such that both sides preliminarily notify with each other of the revision after updating the share to restart the calculation after the agreement is reached.

It may be possible to determine whether the transition management processing No. 1 or the transition management processing No. 2 is adopted according to the requirements of the system.

In the above embodiment, the holding unit may be, in one example, a hard disk or a semiconductor memory. Additionally, those skilled in the art who have read the present specification would understand that, on the basis of the description in the present specification, individual parts can be implementable by a CPU (not illustrated), an application program module installed, a system program module, a semiconductor memory that temporarily stores the content of data read from a hard disk, and the like.

The secret sharing-based MPC system 70 according to the present embodiment can reduce the risk of leakage of the original data caused by, for example, insufficient capacity of the device manager. In the conventional secret sharing-based MPC, it is regarded as data leakage when the detection of leakage of one share value is delayed and, meanwhile, the leakage of the other share value occurs. In contrast, the secret sharing-based MPC system 70 according to the present embodiment updates shares by periodically generating the share-updating random number and, thus, no leakage of the original data occurs unless the share value of the same revision leaks approximately simultaneously.

Further, the secret sharing-based MPC system 70 according to the present embodiment can contribute to forensics by controlling malicious attacks and, in case of data leakage, can narrow down suspects. The secret sharing-based MPC system 70 improves traceability by matching the access history of the environment A device 72 with the access history of the environment B device 74, thus increasing the psychological barrier against execution of attacks. If data leakage occurs, it is highly probable that the data leakage has occurred between the "data creation/change" point and the "revision at which simultaneous access occurrence" point, thus supporting the forensics at the timing of problem occurrence. This improves accountability.

Figure 19:
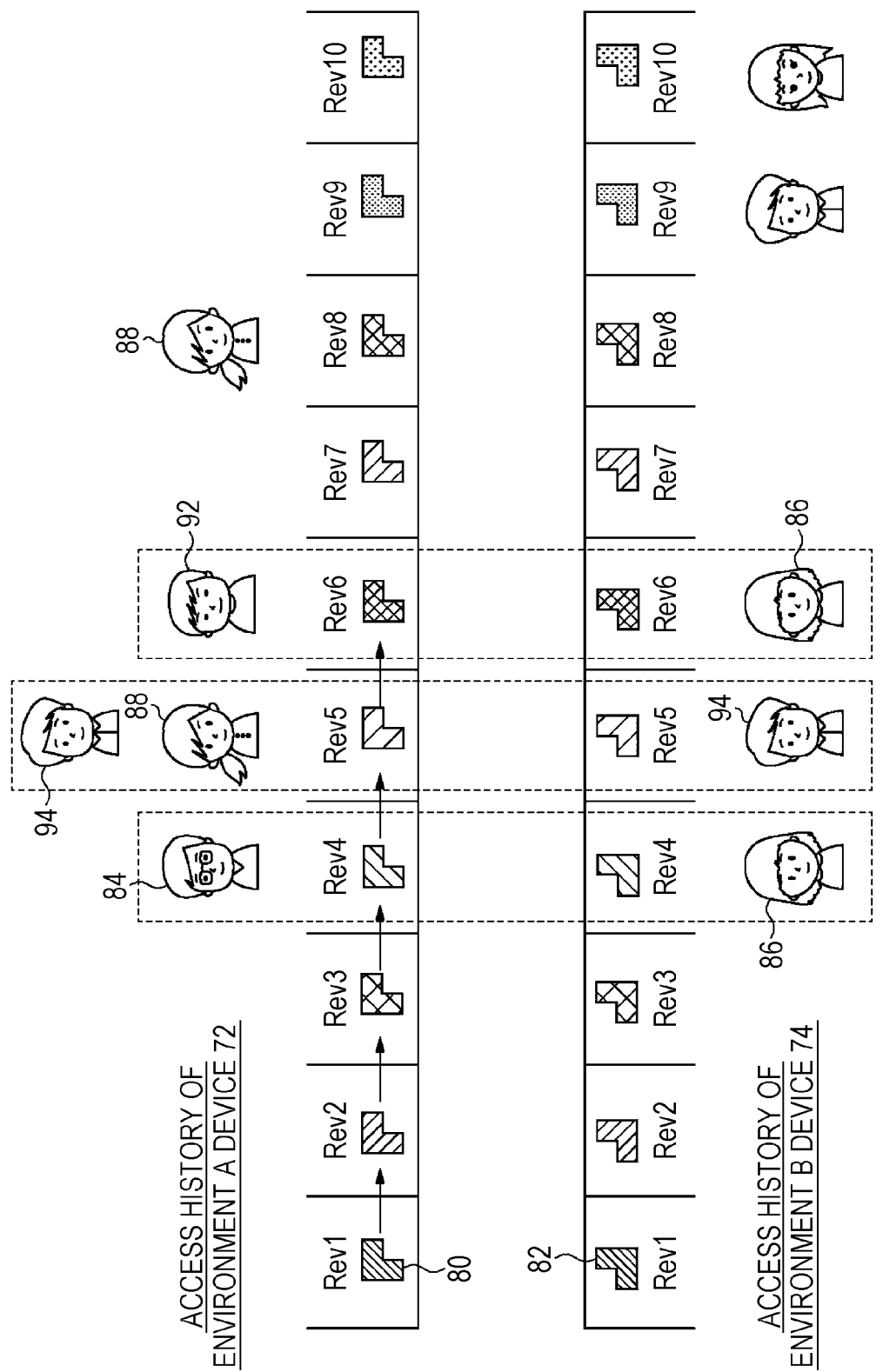
FIG. 19 is a schematic diagram illustrating improvement in traceability by the secret sharing-based MPC system according to the present embodiment.

FIG. 19 is a schematic diagram illustrating an improvement in traceability by the secret sharing-based MPC system 70 according to the present embodiment. The upper part of FIG. 19 illustrates the access history of the environment A device 72 to one of the shares 80 obtained by dividing the original data. The lower part of FIG. 19 illustrates the access history of the environment B device 74 to the other share 82. By combining two shares 80 and 82 of the same revision, the original data can be restored. Thus, in the secret sharing-based MPC system 70 according to the present embodiment, the timeline can be hashed at the time of updating the share, so that the suspect who has caused the leakage can be narrowed down.

In the example of FIG. 19, at the time of revision numbers "Rev4", "Rev5", and "Rev6", simultaneous accesses to two shares 80 and 82 have occurred. Therefore, if the leakage of the original data occurs, the users 84, 86, 88, 90, 92, and 94 related to the revision numbers "Rev4", "Rev5", and "Rev6" are suspicious. If the same user has accessed to two shares 80, 82 of the same revision, that user is, of course, most suspicious. Therefore, in the example of FIG. 19, the user 94 is most suspicious as the culprit who has caused the leakage. Next, the user who has accessed many times is suspicious, so that the user 86 who has accessed twice for the revision numbers "Rev4", "Rev5", and "Rev6" is suspicious. Also, considering the possibility of collusion of different users, a pair of user 84 and user 86 and a pair of user 92 and user 86, both pairs accessing the two shares 80 and 82 of the same revision (Rev4) and (Rev6), respectively, are suspicious for collusion. Conversely, if the revisions are shifted, there is no problem even if the two shares 80 and 82 are accessed, so it can be said that, for example, the probability of collusion between the user 88 and the user 86 is low.

Thus, according to the secret sharing-based MPC system 70 of the present embodiment, a collusion prevention scheme that supports system auditing can be provided.

Application Example

Figure 20:
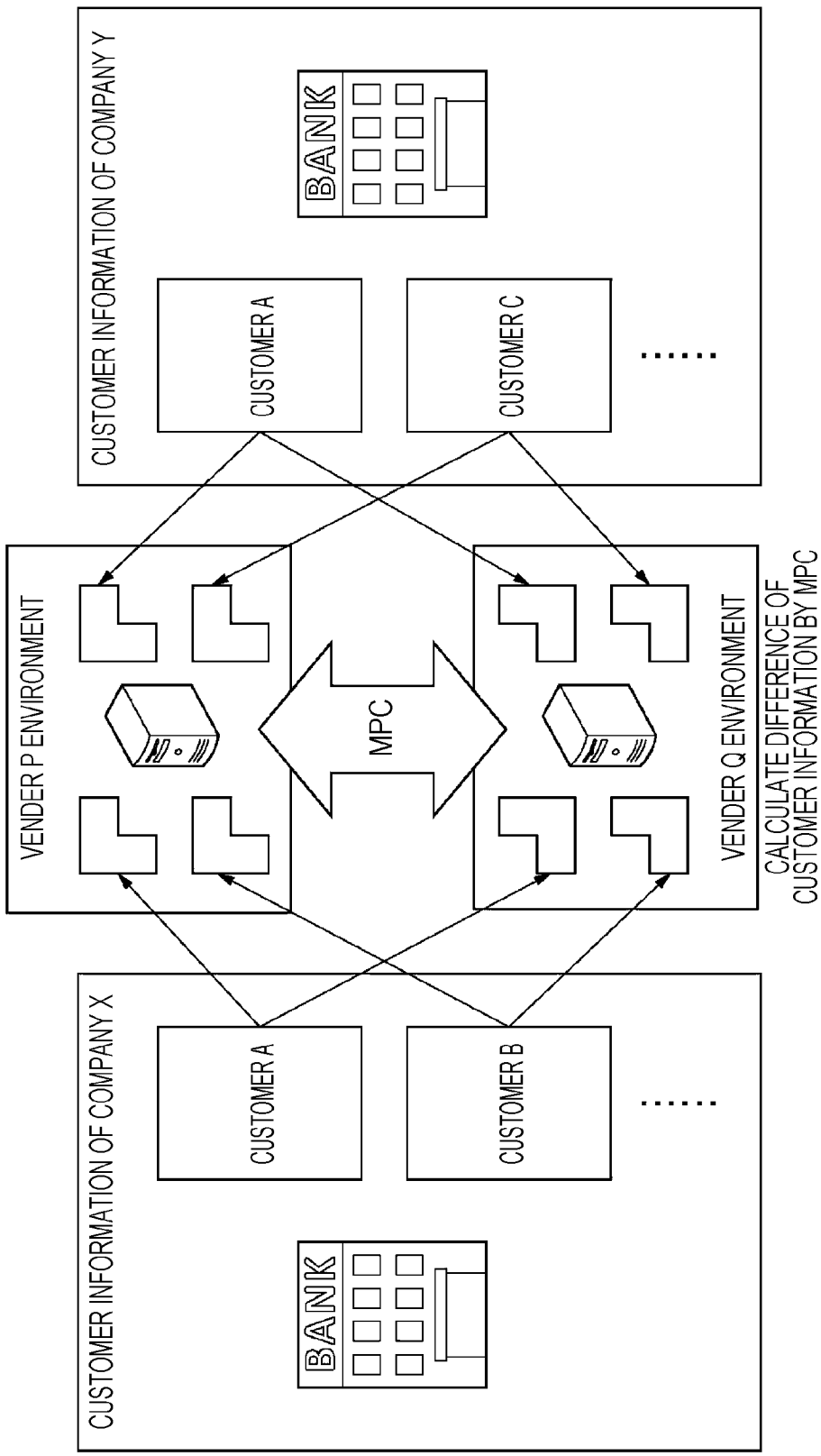
FIG. 20 is a schematic diagram for explaining an application example of the secret sharing-based MPC according to the present embodiment.

FIG. 20 is a schematic diagram for describing an application example of the secret sharing-based MPC according to the present embodiment. This application example reduces the risk of leakage of sensitive data and improves traceability in case of emergency by applying the secret sharing-based MPC according to the present embodiment in supporting M&A using secret computation.

When considering M&A among companies in the same industry, a higher M&A effect is expected if there is an overlapping of the customer segment for acquisition. Analyzing the differences in customer profiles, past consumption activities, preferences, and the like can minimize overlapping of the customer segment, but for such analysis, customer information needs to be disclosed once. If M&A fails after the customer information has been disclosed, it could put a significant impact on future competitiveness.

Therefore, in the present application example, each company shares the customer information on the computational environment after setting secrecy on (or generating shares of) the customer information by following the secret computation scheme. Analysis in the form of secret computation without change can achieve more accurate decision-making. Then, a random number generation mechanism similar to the random number generation mechanism 54 of the embodiment is provided, the device in the vendor P environment is configured in the same manner as the environment A device 72, and the device in the vendor Q environment is configured in the same manner as the environment B device 74. Thus, the risk of leakage of customer information can be reduced. Further, it is possible to narrow down the suspect more easily if the leakage occurs.

The configuration and operation of the secret sharing-based MPC system 70 according to the embodiment have been described above. It is to be understood by those skilled in the art that the embodiment is illustrative and various modifications can be made on the combination of individual constituent elements and processing steps, and such modifications are also within the scope of the present invention.

Modification

The embodiment has described, but not in a limiting manner, that the share-updating random number is added to the share in the environment A device 72, while the share-updating random number is subtracted from the corresponding share in the environment B device 74, thus enabling the cancellation of the influence of the share-updating random number when both updated shares are combined. For example, in consideration of the modulus, the share updating may be designed to have no influence of the share-updating random number, for example, "+0", when the updated shares are combined.

Figure 21:
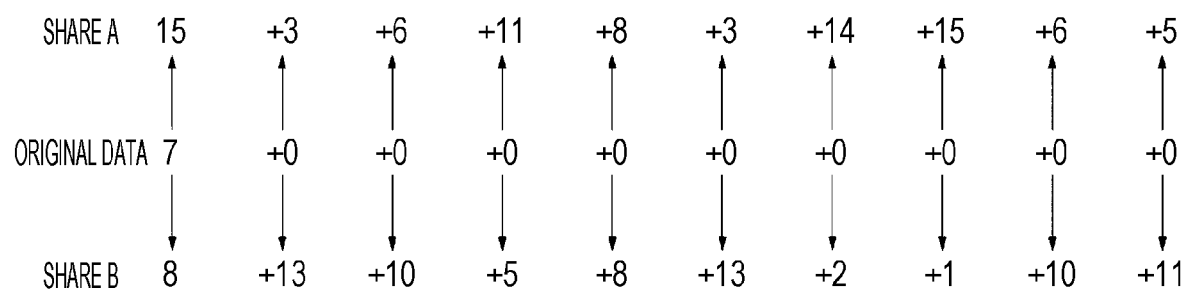
FIG. 21 is a schematic diagram illustrating an idea of a secret sharing-based MPC according to a modification.
Figure 22:
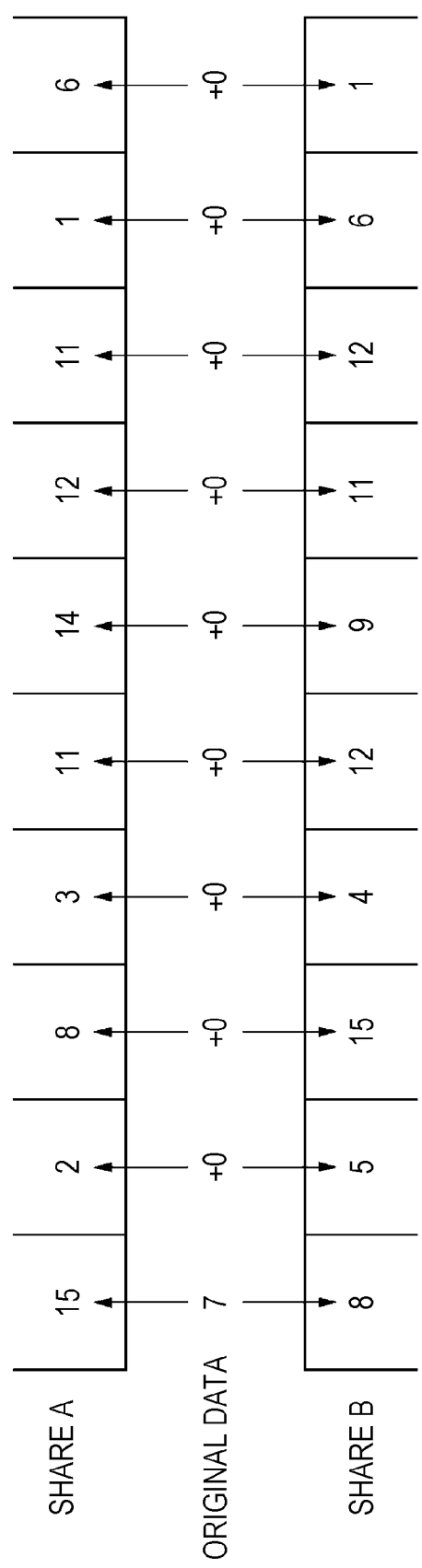
FIG. 22 is a schematic diagram illustrating changes in share values corresponding to FIG. 21.

FIG. 21 is a schematic diagram illustrating the concept of a secret sharing-based MPC according to a modification. FIG. 21 illustrates the change amount of shares at the time of share update. FIG. 22 is a schematic diagram illustrating the change of share values corresponding to FIG. 21. The present modification adds the share having 0 (zero) value periodically to change the share on each device, thus improving security.

Consider an environment where the modulus is 16, that is, the environment is circulated at 16. In this environment, when shares are generated with random numbers, for example, $$7=(15+8) \bmod 16 = 23 \bmod 16 = 7$$

$$0=(3+13) \bmod 16 = 16 \bmod 16 = 0$$

In this modification, the result is always 0 no matter how many times 0 is added to the original data, and the share is updated by a combination of numbers added to 0 under the modulus 16.

In FIGS. 21 and 22, the original data "7" is divided into share A "15" and share B "8" and, by combining both shares, the original data "7" is certainly restored as in the calculation example. When "3" is generated as a share-updating random number, share A is updated by "+3" to become "2", and share B is updated by "+13" calculated from the share-updating random number "3" (note: 13=(−3)%16) in consideration of modulus 16 to become "5". As a result, by combining both shares after the update, (2+5)=7, and the influence of the share-updating random number is "+0" as in the above calculation example. Thus, the original data "7" is restored.

Thus, adding up any upper and lower combination can provide the original data ("7") by taking the remainder 16. However, if the combination is changed, the original data cannot be restored except for an accidental match.

REFERENCE SIGNS LIST

54 Random number generation mechanism
70 Secret sharing-based MPC system
72 Environment A device
74 Environment B device

The invention claimed is:

1. A secret sharing-based multi-party computation system comprising:
   a random number generation mechanism for generating a random number; and
   a plurality of devices provided in different environments, wherein the random number generation mechanism and each of the plurality of devices communicate with each other via a network,
   each of the plurality of devices comprises a memory for storing a program, and a processor for executing the program stored in the memory to perform:
      holding a share used for secret sharing-based multi-party computation, wherein the share is one of shares into which original data are split, and the original data are able to be restored by combining the shares held in a predetermined number or more of the plurality of devices;
      acquiring the random number from the random number generation mechanism; and
      updating the share of respective one of the plurality of devices on a basis of the acquired random number,
   the processor of each of the plurality of devices updates the share of respective one of the plurality of devices in a manner that an influence of the random number is canceled out by combining the shares held in the predetermined number or more of the plurality of devices and updated on the basis of the acquired random number to restore the original data,
   the processor of one of the plurality of devices updates the share of the one of the plurality of devices by applying a first operation using the random number to the share held by the one of the plurality of devices,
   the processor of another one of the plurality of devices updates the share of the another one of the plurality of devices by applying a second operation, different from the first operation, using the random number to the share held by the another one of the plurality of devices, and
   wherein adding up the updated shares of the predetermined number or more of the plurality of devices cancels the influence of the random number and restores the original data.

2. The secret sharing-based multi-party computation system according to claim 1, wherein
   the processor of one of the plurality of devices updates the share of the one of the plurality of devices by adding the random number to the share held by the one of the plurality of devices,
   the processor of another one of the plurality of devices updates the share of the another one of the plurality of devices by subtracting the random number from the share held by the another one of the plurality of devices, and
   wherein adding up the updated shares of the predetermined number or more of the plurality of devices cancels the influence of the random number and restores the original data.

3. The secret sharing-based multi-party computation system according to claim 2, wherein
   the processor of each of the plurality of devices acquires an updated random number, and
   the processor of each of the plurality of devices further updates the updated share of the each of the plurality of devices on a basis of the updated random number.

4. The secret sharing-based multi-party computation system according to claim 3, wherein
   the random number is updated periodically, and
   the processor of each of the plurality of devices acquires the updated random number every time the random number is updated.

5. The secret sharing-based multi-party computation system according to claim 2, wherein the processor of each of the plurality of devices further performs:
   associating the share of the each of the plurality of devices with a value identifying a revision of the share, and
   communicating with the another one of the plurality of devices to perform processing of matching the revision of the share of the each of the plurality of devices having been updated on a basis of the acquired random number with a revision of the corresponding share of the another one of the plurality of devices having been updated on the basis of the random number.

6. The secret sharing-based multi-party computation system according to claim 5, wherein the processor of each of the plurality of devices further performs:
   associating the revision of the share of the each of the plurality of devices with information on an access to the share updated by the revision.

7. The secret sharing-based multi-party computation system according to claim 2, the different environments are different groups of cloud servers managed and operated by different entities.

8. A secret sharing-based multi-party computation method, comprising:
   acquiring a random number generated from a random number generation mechanism by each of a plurality of devices provided in different environments, wherein the random number generation mechanism and each of the plurality of devices communicate with each other via a network, each of the plurality of devices stores a share used for secret sharing-based multi-party computation, the share is one of shares into which original data are split, the original data are able to be restored by combining the shares held in a predetermined number or more of the plurality of devices; and updating the share of respective one of the plurality of devices on a basis of the acquired random number in a manner that an influence of the random number is canceled out by combining the shares held in the predetermined number or more of the plurality of devices and updated on the basis of the acquired random number, wherein the processor of one of the plurality of devices updates the share of the one of the plurality of devices by applying a first operation using the random number to the share held by the one of the plurality of devices, the processor of another one of the plurality of devices updates the share of the another one of the plurality of devices by applying a second operation, different from the first operation, using the random number to the share held by the another one of the plurality of devices, and wherein adding up the updated shares of the predetermined number or more of the plurality of devices cancels the influence of the random number and restores the original data.

\* \* \* \* \*